(12) United States Patent
Kikuchi

(10) Patent No.: US 10,249,851 B2
(45) Date of Patent: Apr. 2, 2019

(54) STACKED BATTERY

(71) Applicant: TOYOTA JIDOSHA KABUSHIKI KAISHA, Toyota-shi, Aichi-ken (JP)

(72) Inventor: Takuro Kikuchi, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 27 days.

(21) Appl. No.: 15/705,932

(22) Filed: Sep. 15, 2017

(65) Prior Publication Data

US 2018/0083235 A1    Mar. 22, 2018

(30) Foreign Application Priority Data

Sep. 16, 2016   (JP) ................ 2016-181770

(51) Int. Cl.
| | | |
|---|---|---|
| *H01M 2/02* | (2006.01) | |
| *H01M 10/04* | (2006.01) | |
| *H01M 2/26* | (2006.01) | |
| *H01M 2/10* | (2006.01) | |
| *H01M 2/20* | (2006.01) | |

(52) U.S. Cl.
CPC ......... *H01M 2/0285* (2013.01); *H01M 2/02* (2013.01); *H01M 2/0212* (2013.01); *H01M 2/0237* (2013.01); *H01M 2/1016* (2013.01); *H01M 2/20* (2013.01); *H01M 2/266* (2013.01); *H01M 10/0413* (2013.01); *H01M 10/0436* (2013.01)

(58) Field of Classification Search
CPC .... H01M 2/0285; H01M 2/02; H01M 2/0212; H01M 2/0237; H01M 2/1016; H01M 2/20; H01M 2/266; H01M 10/0413; H01M 10/0436
USPC ........................................ 429/154
See application file for complete search history.

(56) References Cited

U.S. PATENT DOCUMENTS

| | | | | |
|---|---|---|---|---|
| 5,254,415 A | * | 10/1993 | Williams | H01M 2/0265 429/153 |
| 2012/0088126 A1 | * | 4/2012 | Ahn | H01M 2/0212 429/7 |
| 2014/0065470 A1 | | 3/2014 | Tsutsumi et al. | |
| 2016/0301038 A1 | * | 10/2016 | Modest | H01M 10/39 |

FOREIGN PATENT DOCUMENTS

| | | | |
|---|---|---|---|
| EP | 2562842 | * | 2/2013 |
| JP | 5369342 B1 | | 9/2013 |

OTHER PUBLICATIONS

Specification of U.S. Appl. No. 15/703,305, filed Sep. 13, 2017.

* cited by examiner

*Primary Examiner* — Jayne L Mershon
(74) *Attorney, Agent, or Firm* — Sughrue Mion, PLLC

(57) ABSTRACT

A stacked battery includes a first current collecting case, a second current collecting case, and a third current collecting case, a first electrode body and a second electrode body. Each of The first current collecting case and the second current collecting case includes a positive electrode wall portion. Each of the second current collecting case and the third current collecting case includes a second negative electrode wall portion.

5 Claims, 18 Drawing Sheets

STACKED BATTERY

INCORPORATION BY REFERENCE

The disclosure of Japanese Patent Application No. 2016-181770 filed on Sep. 16, 2016 including the specification, drawings and abstract is incorporated herein by reference in its entirety.

BACKGROUND

1. Technical Field

The present disclosure relates to a structure of a stacked battery.

2. Description of Related Art

Conventionally, there have been proposed various chargeable and dischargeable secondary batteries. For example, a secondary battery described in Japanese Patent No. 5369342 is a stacked battery, and includes a cylindrical outer case body, electrode bodies disposed inside the outer case body, and a bar-shaped shaft portion extending through the electrode bodies. In the electrode body, positive electrode plates and negative electrode plates are alternately arranged, and separators are disposed between the positive electrode plates and the negative electrode plates.

SUMMARY

In the above-configured stacked battery, the bar-shaped shaft portion is used as a current collector so as to secure an electric contact with the negative electrode plates. Unfortunately, in the case of using the bar-shaped shaft portion, machining for forming through-holes in electrode bodies so as to insert the shaft portion through the electrode bodies is separately required. A component as the shaft portion is also additionally required.

In stacked batteries, this disclosure is directed to a stacked battery having a configuration that eliminates machining for forming through-holes in electrode bodies.

This stacked battery includes electrode bodies formed by alternately stacking multiple positive electrode plates and multiple negative electrode plates with separators interposed between the positive electrode plates and the negative electrode plates, and cases that have electric conductivity and house the electrode bodies thereinside.

As example aspect of the present disclosure includes a stacked battery. The stacked battery includes a first electrode body including a plurality of positive electrode plates, a plurality of negative electrode plates, and a plurality of separators, each of the positive electrode plates and each of negative electrode plates being alternately stacked with each of the separators interposed between each of the positive electrode plates and each of the negative electrode plates; a second electrode body including a plurality of positive electrode plates, a plurality of negative electrode plates, and a plurality of separators, each of the positive electrode plate and each of negative electrode plates being alternately stacked with each of the separators interposed between each of the positive electrode plates and each of the negative electrode plates; the second electrode body provided above the first electrode body, each positive electrode plate including a positive electrode protruding portion protruding more laterally than the negative electrode plate, each negative electrode plate including a negative electrode protruding portion protruding more laterally than the positive electrode plate; a first current collecting case being electrically conductive, the first current collecting case including a first facing portion facing the first electrode body in a stacking direction of the first electrode body and the second electrode body; a second current collecting case being electrically conductive, the second current collecting case housing the first electrode body, the second current collecting case being disposed between the first electrode body and the second electrode body, the second current collecting case being configured to be electrically insulated from the first current collecting case, the second current collecting case including a second facing portion facing one of the first electrode body and the second electrode body in the stacking direction; and a third current collecting case being electrically conductive, the third current collecting case housing the second electrode body, the third current collecting case being configured to be electrically insulated from the second electrode body, the third current collecting case including a third facing portion facing the second electrode body in the stacking direction, the first current collecting case, the second current collecting case, and the third current collecting case being stacked in this order in the stacking direction, the first current collecting case including a first positive electrode wall portion, the first positive electrode wall portion extending from an edge portion of the first facing portion such that the first positive electrode wall portion covers a first side portion where the positive electrode protruding portion of the first electrode body is located, an inner surface of the first positive electrode wall portion being electrically connected to an edge side of the positive electrode protruding portion of the first electrode body, the second current collecting case including a second positive electrode wall portion, the second positive electrode wall portion extending from an edge portion of the second facing portion such that the second positive electrode wall portion covers a first side portion where the positive electrode protruding portion of the second electrode body is located, an inner surface of the second positive electrode wall portion being electrically connected to an edge side of the positive electrode protruding portion of the second electrode body, the second current collecting case including a first negative electrode wall portion, the first negative electrode wall portion extending from an edge portion of the second facing portion such that the first negative electrode wall portion covers a second side portion where the negative electrode protruding portion of the first electrode body is located, an inner surface of the first negative electrode wall portion being electrically connected to an edge side of the negative electrode protruding portion of the first electrode body, the third current collecting case including a second negative electrode wall portion, the second negative electrode wall portion extending from an edge portion of the third facing portion such that the second negative electrode wall portion covers a second side portion where the negative electrode protruding portion of the second electrode body is located, an inner surface of the second negative electrode wall portion being electrically connected to an edge side of the negative electrode protruding portion of the second electrode body.

According to the above stacked battery, the edge sides of each positive electrode plate are electrically connected to the inner surfaces of the positive electrode wall portions of each current collecting case, and the edge sides of each negative electrode plate are electrically connected to the inner surfaces of the negative electrode wall portions of each current collecting case. In this manner, the contact between the inner surfaces of each case portion and the edge sides of each electrode plate allows an easy electric connection, and eliminates necessity of using a bar-shaped shaft portion extending through the electrode bodies, which is used in the related art.

The positive electrode protruding portion may include a pair of protruding portions such that one of protruding portions faces the other one of the protruding portions, the first positive electrode wall portion may include a pair of wall portions that are electrically connected to the positive electrode protruding portion of the first electrode body, the second positive electrode wall portion may include a pair of wall portions that are electrically connected to the positive electrode protruding portion of the second electrode body, the negative electrode protruding portion may include a pair of protruding portions such that one of the protruding portions faces the other one of the protruding portions, the first negative electrode wall portion may include a pair of wall portion that are electrically connected to the negative electrode protruding portion of the first electrode body, and the second negative electrode wall portion may include a pair of wall portions that are electrically connected to the negative electrode protruding portion of the second electrode body.

A whole of the edge side of the positive electrode protruding portion may be electrically connected to the first positive electrode wall portion, a whole of the edge side of the positive electrode protruding portion may be electrically connected to the second positive electrode wall portion, a whole of the edge side of the negative electrode protruding portion may be electrically connected to the first negative electrode wall portion, and a whole of the edge side of the negative electrode protruding portion may be electrically connected to the second negative electrode wall portion.

The edge portion of the first facing portion of the first current collecting case and the edge portion of the first positive electrode wall portion of the first current collecting case may be in contact respectively with the edge portion of the second facing portion of the second current collecting case and the edge portion of the first negative electrode wall portion of the second current collecting case via electric insulating members, and the edge portion of the second facing portion of the second current collecting case and the edge portion of the second positive electrode wall portion of the second current collecting case may be in contact respectively with the edge portion of the third facing portion of the third current collecting case and the edge portion of the second negative electrode wall portion of the third current collecting case via electric insulating members.

Each of the first current collecting case, the second current collecting case, and the third current collecting case may have a rectangular shape as viewed from the stacking direction. The first electrode body may include the positive electrode protruding portion, the second electrode body may include the positive electrode protruding portion, the positive electrode protruding portion of the first electrode body may be provided at a position where the positive electrode protruding portion of the first electrode body and the positive electrode protruding portion of the second electrode body face each other. The first electrode body may include the negative electrode protruding portion, the second electrode body may include the negative electrode protruding portion, the negative electrode protruding portions of the first electrode body may be provided at a position where the negative electrode protruding portion of the first electrode body and the negative electrode protruding portion of the second electrode body face each other. The first current collecting case may include the first positive electrode wall portion, the second current collecting case may include the second positive electrode wall portion, the second current collecting case may include the first negative electrode wall portion, and the third current collecting case may include the second negative electrode wall portion.

According to this stacked battery, it is possible to provide a stacked battery having a configuration that eliminates machining for forming through-holes in electrode bodies.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
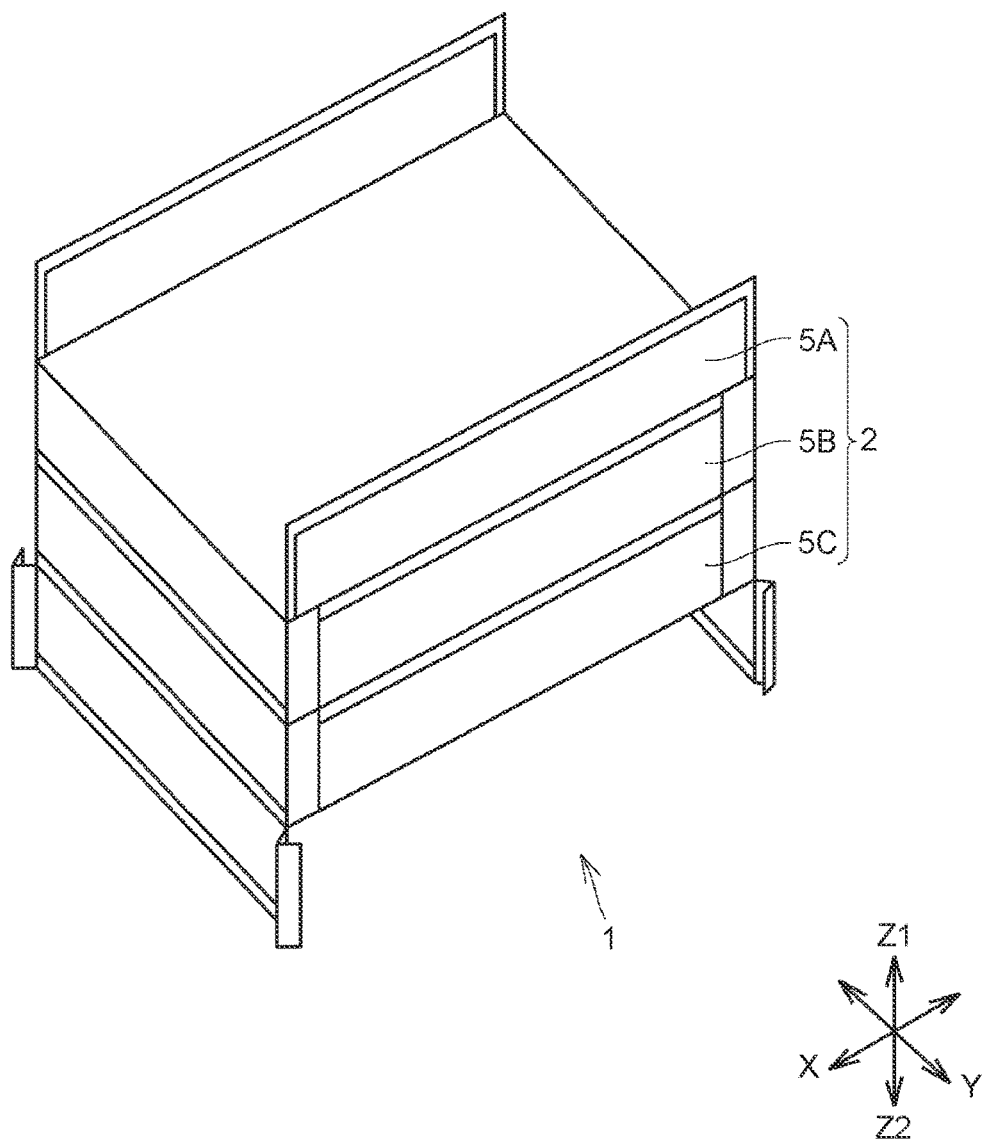
FIG. 1 is an overall perspective view showing a structure of a stacked battery of an embodiment 1.

Each embodiment of a stacked battery based on the present disclosure will be described with reference to drawings, hereinafter. In each embodiment as will be described below, the present disclosure is not necessarily limited to the number, the quantity and the like as mentioned, unless otherwise noted. The components identical or corresponding to each other will be denoted by the same reference numerals, and a description thereof might not be repeated depending on the case. It has originally been intended that features of the embodiments are used in combination as appropriate. In the drawings, for the purpose of easy understanding, some components are described using different ratios.

Hereinafter, as one example of the stacked battery, each embodiment of an aqueous battery will be described. An aqueous battery is a battery in which an aqueous solution such as an alkaline electrolyte is used as an electrolytic solution. Aqueous means "protic", and "nonaqueous" means "nonprotic". A "protic" solvent means a solvent in which hydrogen ions (protons) are emitted due to dissociation of molecules. A "nonprotic" solvent is a solvent that emits no protons. For example, alcohol is an organic solvent, and discharges protons; thus alcohol is included in "protic" solvent. An electrolytic solvent of a lithium ion battery is not merely an organic solvent, but is a "nonprotic" solvent including molecules having no portions from which protons can be taken out.

In the following description, of directions indicated by arrows Z1, Z2, X, Y, the arrows Z1 (a first direction) and Z2 (a second direction) denote a stacking direction in which positive electrode plates 40, negative electrode plates 42, and separators 41 of an electrode body 3 described later are stacked, and the arrows X, Y denote respective directions respectively orthogonal to the arrows Z1, Z2. The arrow X and the arrow Y are directions mutually orthogonal to each other.

Figure 2:
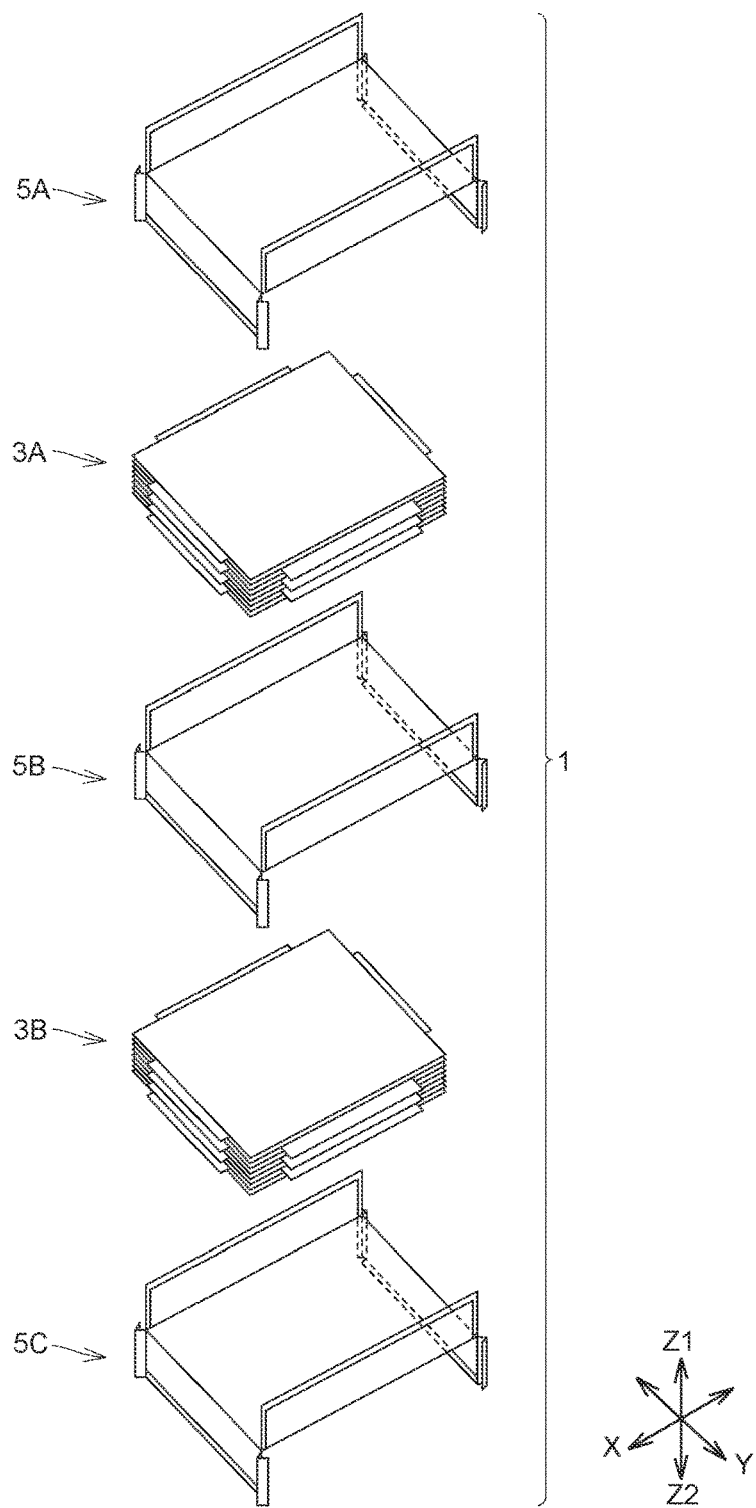
FIG. 2 is an overall exploded perspective view showing the structure of the stacked battery of the embodiment 1.
Figure 3:
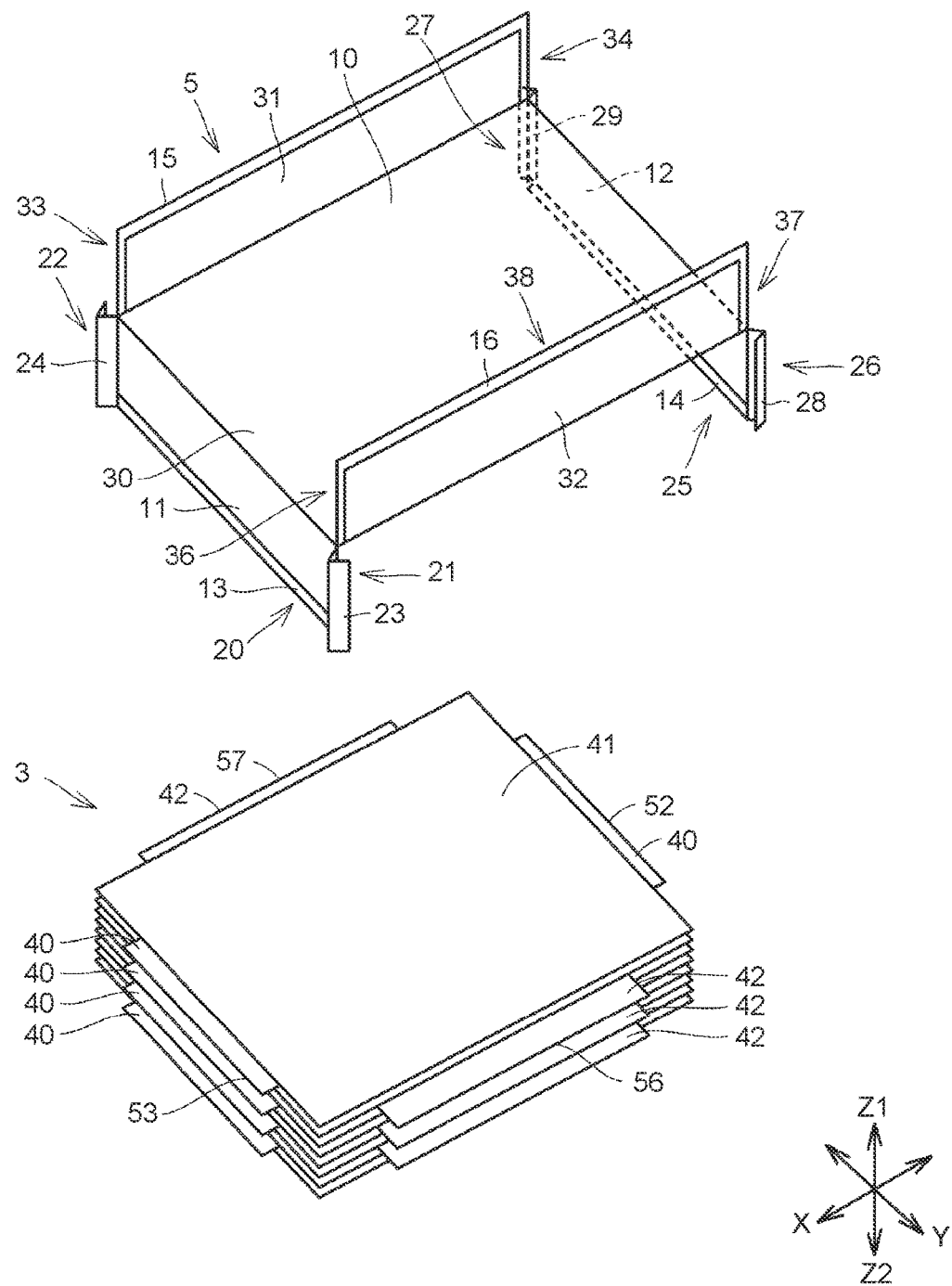
FIG. 3 is an exploded perspective view showing structures of a current collecting case and an electrode body of the embodiment 1.
Figure 4:
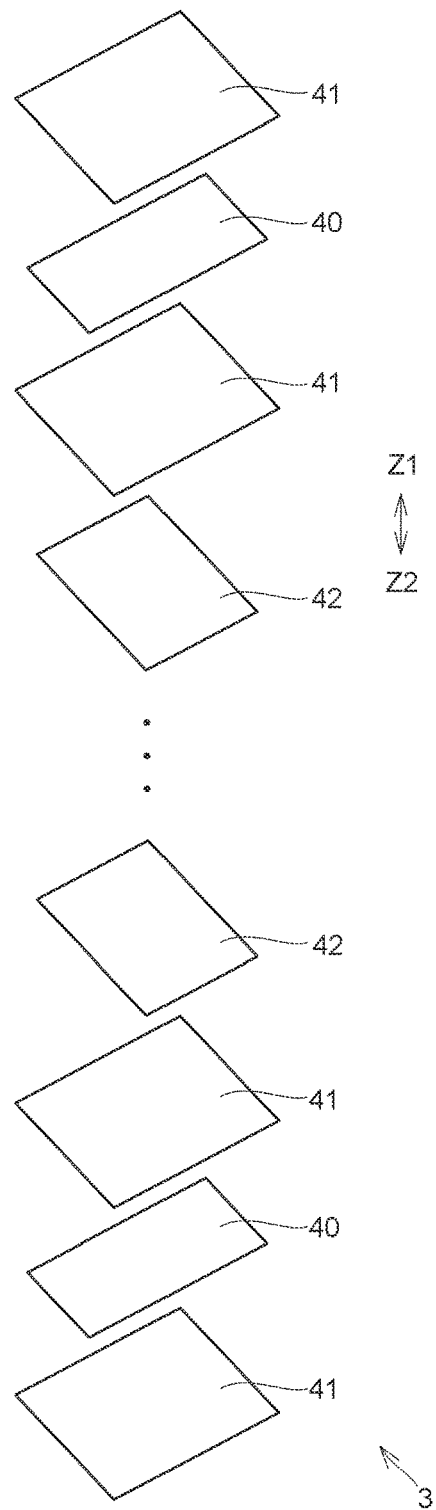
FIG. 4 is an exploded perspective view showing the structure of the electrode body.

With reference to FIG. 1 to FIG. 4, a configuration outline of the stacked battery 1 of the present embodiment will be described. FIG. 1 is an overall perspective view showing a structure of the stacked battery 1, FIG. 2 is an overall exploded perspective view showing a structure of the stacked battery 1, FIG. 3 is an exploded perspective view showing structures of a current collecting case 5 and an electrode body 3, and FIG. 4 is an exploded perspective view showing a structure of the electrode body 3.

The stacked battery 1 includes a first current collecting case 5A, a second current collecting case 5B, and a third current collecting case 5C each of which has an identical structure. These current collecting cases are so stacked as to form a case 2. Inside the case 2, a first electrode body 3A and a second electrode body 3B are housed as the electrode bodies. The case 2 is formed in a substantially rectangular parallelepiped shape.

As viewed from the first electrode body 3A, the first current collecting case 5A is disposed on a direction Z1 side that is an opposite side to the second electrode body 3B. The second current collecting case 5B is disposed between the first electrode body 3A and the second electrode body 3B, and is electrically insulated from the first current collecting case 5A. The third current collecting case 5C is disposed on a direction Z2 side that is an opposite side to the second current collecting case 5B as viewed from the second electrode body 3B, and is electrically insulated from the second current collecting case 5B.

That is, the first current collecting case 5A and the second current collecting case 5B are joined to each other with an electric insulating member interposed therebetween, and the first electrode body 3A is housed in an inner space of these cases, and the second current collecting case 5B and the third current collecting case 5C are joined to each other with an electric insulating member interposed therebetween, and the second electrode body 3B is housed in an inner space of these cases. The first current collecting case 5A, the second current collecting case 5B, and the third current collecting case 5C are formed of metallic Ni or Ni-plated steel plates.

With reference to FIG. 3 and FIG. 4, respective structures of each current collecting case and each electrode body will be described. The first current collecting case 5A, the second current collecting case 5B, and the third current collecting case 5C have an identical form, and the first electrode body 3A and the second electrode body 3B have an identical form. Therefore, in FIG. 3 and FIG. 4, the respective structures of these members will be described as structures of the current collecting case 5 and the electrode body 3.

The current collecting case 5 includes: a facing portion 10 having a rectangular shape and facing the electrode body 3; a pair of first positive electrode wall portion 11 and second positive electrode wall portion 12 that extend from the edge portions of the facing portion 10 in the direction Z2 so as to cover a pair of first side portions facing each other of the electrode body 3 located on the direction Z2 side, inner surfaces of the pair of first positive electrode wall portion 11 and second positive electrode wall portion 12 being electrically connected to edge sides 52, 53 of the positive electrode plates 40 of the electrode body 3; and a pair of first negative electrode wall portion 31 and second negative electrode wall portion 32 that extend from the edge portions of the facing portion 10 in the direction Z1 so as to cover a pair of second side portions facing each other of the electrode body 3 located on the direction Z1 side, inner surfaces of the pair of first negative electrode wall portion 31 and second negative electrode wall portion 32 being electrically connected to edge sides 56, 57 of the negative electrode plates 42.

A gasket 13 as an electric insulating member is fixed to an edge portion of the first positive electrode wall portion 11 with an adhesive agent or the like, and a gasket 14 as an electric insulating member is fixed to an edge portion of the second positive electrode wall portion 12 with an adhesive agent or the like.

The first positive electrode wall portion 11 and the second positive electrode wall portion 12 extend from the edge portions of the facing portion 10 in the direction Z2, and the first positive electrode wall portion 11 and the second positive electrode wall portion 12 are so disposed as to face each other.

Each first positive electrode wall portion 11 includes an edge portion 20 that connects an edge portion 21 and an edge portion 22. The edge portion 21 is formed with a caulking piece 23, and the edge portion 22 is provided with a caulking piece 24. As described above, the gasket 13 as an electric insulating member is fixed to the edge portion 20 with the adhesive agent or the like. The gasket 13 is formed of an electrically-insulating resin material or the like.

Each second positive electrode wall portion 12 includes an edge portion 25 that connects an edge portion 26 and an edge portion 27. The edge portion 26 is formed with a caulking piece 28, and the edge portion 27 is provided with a caulking piece 29. As described above, the gasket 14 as an electric insulating member is fixed to the edge portion 25 with the adhesive agent or the like. The gasket 14 is formed of an electrically-insulating resin material or the like.

Each first negative electrode wall portion 31 includes an edge portion 35 that connects an edge portion 33 and an edge portion 34. As described above, the gasket 15 as an electric insulating member is fixed to the edge portion 33, the edge portion 34, and the edge portion 35 with the adhesive agent or the like. The gasket 15 is formed of an electrically-insulating resin material or the like.

Each second negative electrode wall portion 32 includes an edge portion 38 that connects an edge portion 36 and an edge portion 37. As described above, the gasket 16 as an electric insulating member is fixed to the edge portion 36, the edge portion 37, and the edge portion 38 with the adhesive agent or the like. The gasket 16 is formed of an electrically-insulating resin material or the like.

The first current collecting case 5A, the second current collecting case 5B, and the third current collecting case 5C that have the above configurations are all formed in the identical shape to the shape of the current collecting case 5, and as shown in FIG. 1, when the first current collecting case 5A, the second current collecting case 5B, and the third current collecting case 5C are so combined as to form the case 2, the caulking pieces 23, 24, 28, 29 are caulked together with the edge portions 36, 33, 37, 34.

In this manner, also when the first current collecting case 5A, the second current collecting case 5B, and the third current collecting case 5C are integrated, the electric insulation among the first current collecting case 5A, the second current collecting case 5B, and the third current collecting case 5C is secured by the gaskets 13, 14, 15, and 16.

Next, the configuration of the electrode body 3 will be described. In the electrode body 3, the multiple positive electrode plates 40 and the multiple negative electrode plates 42 are alternately stacked while the separator 41 is interposed between each positive electrode plate 40 and each negative electrode plate 42. In the present embodiment, as shown in FIG. 3, multiple layers of the positive electrode plates 40 and the negative electrode plates 42 are alternately stacked with the separators 41 interposed therebetween.

Each positive electrode plate 40 has a plate-like shape. The positive electrode plate 40 has a positive electrode active material. As the positive electrode active material, nickel hydroxide may be used, for example. As one example of the positive electrode plate 40, the positive electrode plate 40 has a configuration that a paste mainly containing nickel hydroxide is applied on a base plate.

Each negative electrode plate 42 has a plate-like shape. The negative electrode plate 42 has a negative electrode active material. As the negative electrode active material, a hydrogen absorbing alloy may be used, for example. As one example of the negative electrode plate 42, the negative electrode plate 42 has a configuration that a paste mainly containing a hydrogen absorbing alloy is applied on a base plate.

As the base plates composing the positive electrode plates 40 and the negative electrode plates 42, electrically conductive members having porosity may be used, for example. As the electrically conductive members having porosity, foamed nickel sheets may be used, for example.

The separators 41 prevent short-circuit between the positive electrode plates 40 and the negative electrode plates 42, and also retain the electrolytic solution. As the separator 41, porous sheet having ionic permeability and electric insulation is used. As the separator 41, polyolefin-based non-woven fabric may be employed, for example. As the electrolytic solution, for example, an alkali-based aqueous solution or a KOH aqueous solution that is generally used in nickel-hydrogen batteries may be employed.

When the electrode body 3 is configured, the positive electrode plates 40 and the negative electrode plates 42 are stacked while the separators 41 previously impregnated with the electrolytic solution are interposed therebetween, and after the electrode body 3 is housed in the case 2, the electrolytic solution is preferably filled into the case 2 from a filling port (not shown) provided to the case 2. After the electrolytic solution is filled, the filling port is sealed by a sealing member.

Figure 5:
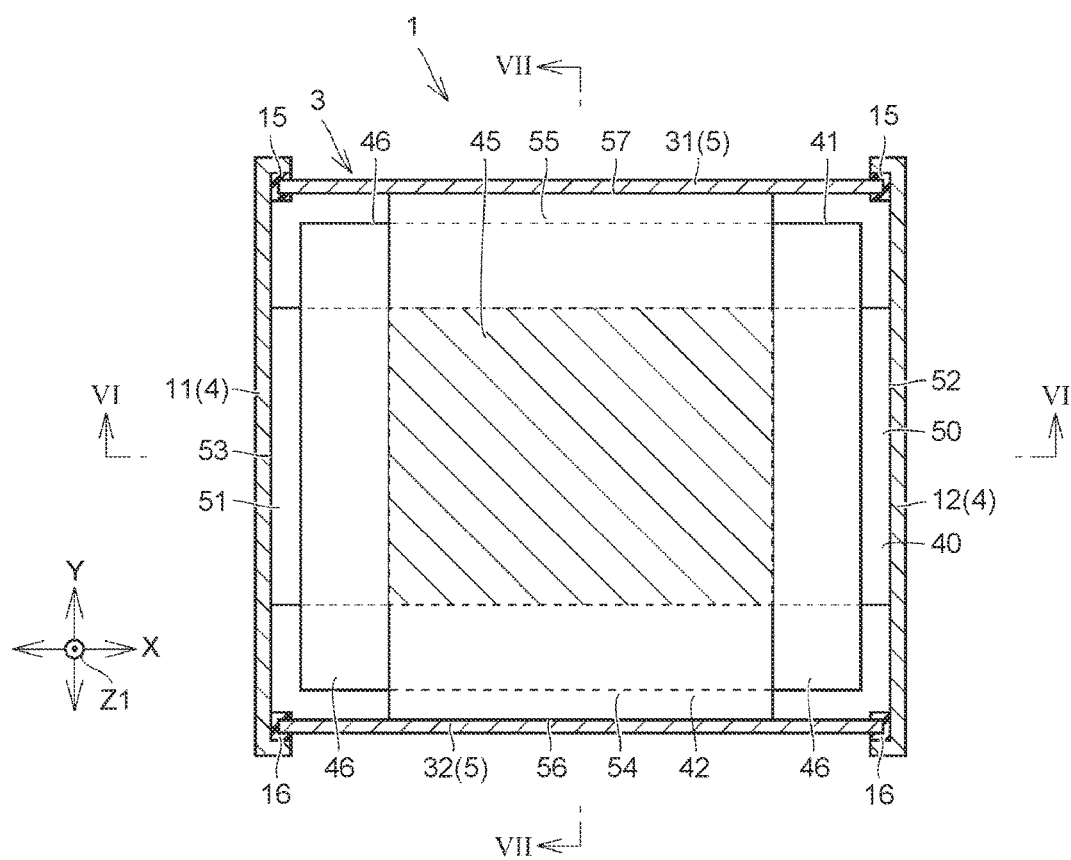
FIG. 5 is a plan view of the electrode body as viewed from the stacking direction.
Figure 6:
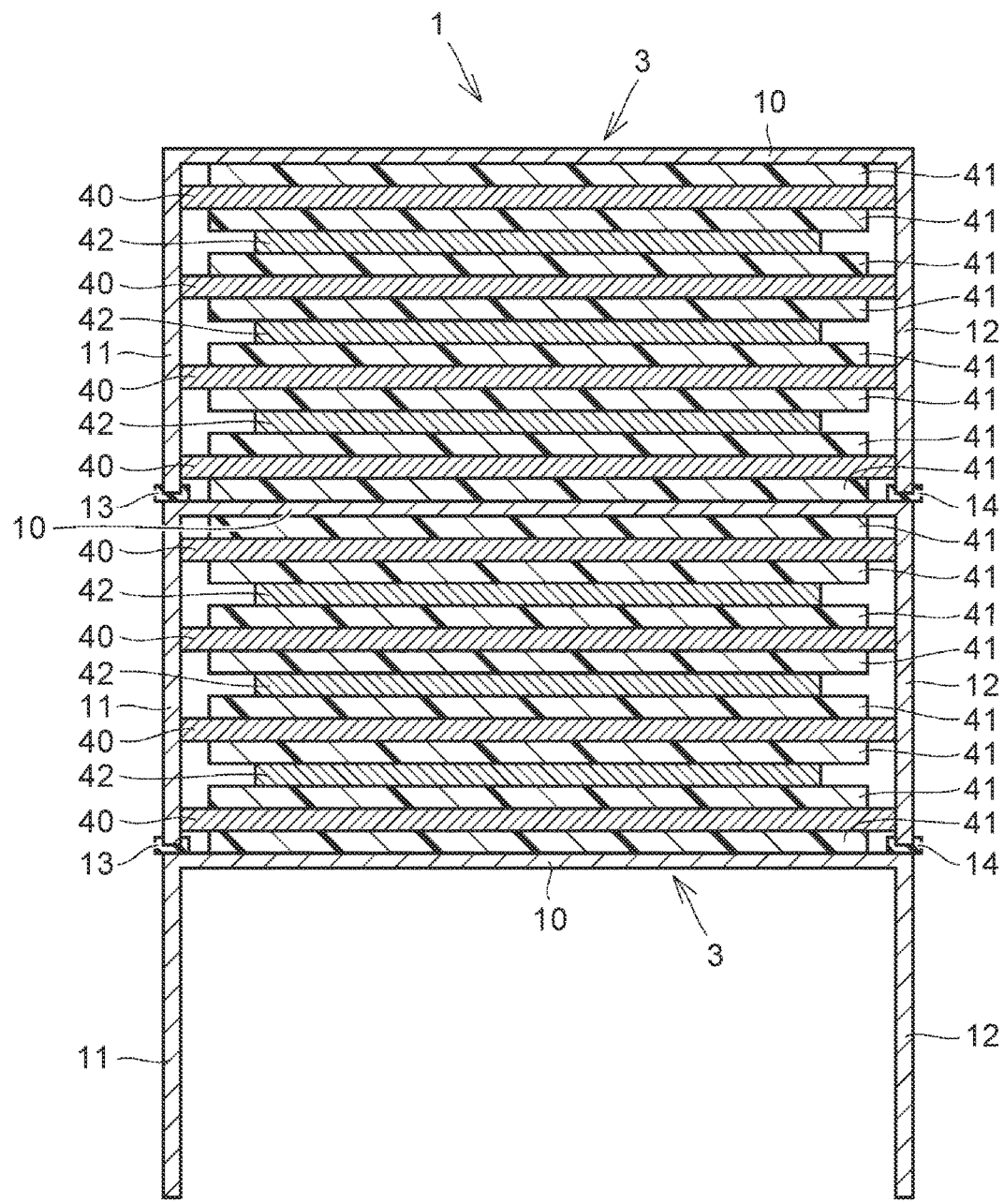
FIG. 6 is a cross sectional view taken along line VI-VI in FIG. 5.
Figure 7:
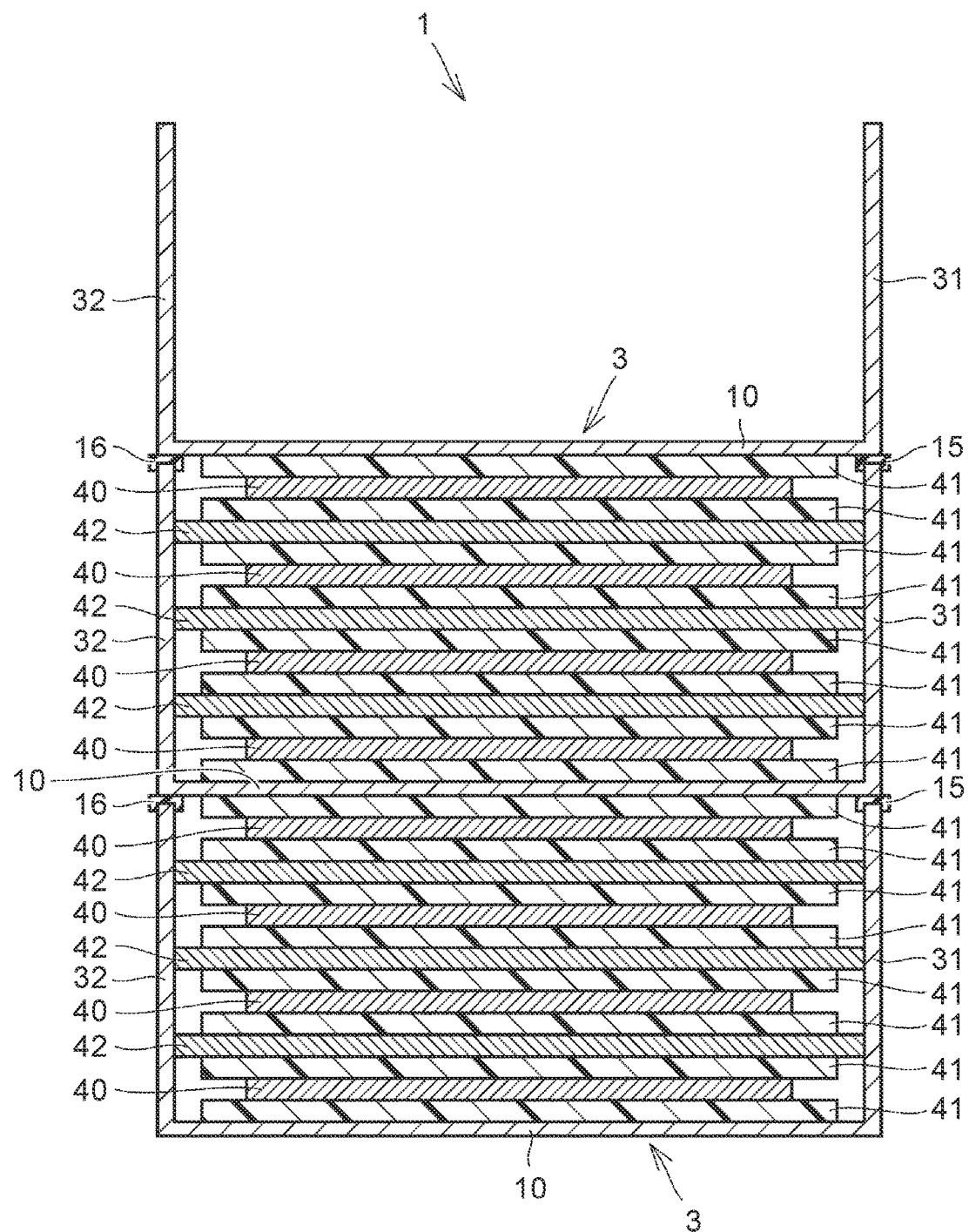
FIG. 7 is a cross sectional view taken along line VII-VII in FIG. 5.

With reference to FIG. 5 to FIG. 7, a housed state of the electrode body 3 housed in the case 2 will be described. FIG. 5 is a plan view of the electrode body as viewed from the stacking direction, and FIG. 6 is a cross sectional view taken along line VI-VI in FIG. 5, and FIG. 7 is a cross sectional view taken along line VII-VII in FIG. 5.

Each positive electrode plate 40 includes protruding portions 50, 51 protruding more laterally (in the direction X) than the separator 41 and the negative electrode plate 42, and the protruding portion 50, 51 include edge sides 52, 53. The edge sides 52, 53 compose a pair of first side portions of the electrode body 3. Each negative electrode plate 42 includes protruding portions 54, 55 protruding more laterally (in the direction Y) than the separator 41 and the positive electrode plate 40, and the protruding portion 54, 55 include edge sides 56, 57. The edge sides 56, 57 compose a pair of second side portions of the electrode body 3.

The entire edge side 53 of each positive electrode plate 40 is in contact with the first positive electrode wall portion 11 of the current collecting case 5. The entire edge side 52 of each positive electrode plate 40 is in contact with the second positive electrode wall portion 12 of the current collecting case 5.

Each positive electrode plate 40 may be connected to the first positive electrode wall portion 11 and the second positive electrode wall portion 12 via flexible members having electric conductivity such as Celmet and an electrically conductive adhesive agent. Alternatively, the positive electrode plate 40 may be connected to the first positive electrode wall portion 11 and the second positive electrode wall portion 12 through welding or the like.

Each positive electrode plate 40 is configured to have a length in the first direction slightly longer than a distance between the first positive electrode wall portion 11 and the second positive electrode wall portion 12 in the direction X, and may be pressed to be in contact with inner surfaces of the first positive electrode wall portion 11 and the second positive electrode wall portion 12 so as to be connected to the first positive electrode wall portion 11 and the second positive electrode wall portion 12. Both ends of the multiple positive electrode plates 40 are pressed to be in contact with the first positive electrode wall portion 11 and the second positive electrode wall portion 12, to thereby secure the contact of each positive electrode plate 40 with the first positive electrode wall portion 11 and the second positive electrode wall portion 12. The first positive electrode wall portion 11 and the second positive electrode wall portion 12 function as current collectors for the positive electrode.

The entire edge side 57 of each negative electrode plate 42 is in contact with the first negative electrode wall portion 31 of the second current collecting case 5B. The entire edge side 56 of each negative electrode plate 42 is in contact with the second negative electrode wall portion 32 of the second current collecting case 5B.

Each negative electrode plate 42 may be connected to the first negative electrode wall portion 31 and the second negative electrode wall portion 32 via flexible members having electric conductivity such as Celmet and an electrically conductive adhesive agent. Alternatively, the negative electrode plate 42 may be connected to the first negative electrode wall portion 31 and the second negative electrode wall portion 32 through welding or the like.

Each negative electrode plate 42 is configured to have a length in the first direction slightly longer than a distance between the first negative electrode wall portion 31 and the second negative electrode wall portion 32 in the direction Y, and may be pressed to be in contact with inner surfaces of the first negative electrode wall portion 31 and the second negative electrode wall portion 32 so as to be connected to the first negative electrode wall portion 31 and the second negative electrode wall portion 32. Both ends of the multiple negative electrode plates 42 are pressed to be in contact with the first negative electrode wall portion 31 and the second negative electrode wall portion 32, to thereby secure the contact of each negative electrode plate 42 with the first negative electrode wall portion 31 and the second negative electrode wall portion 32. The first negative electrode wall portion 31 and the second negative electrode wall portion 32 function as current collectors for the negative electrode.

According to the configuration of the stacked battery 1 of the present embodiment, it is configured that plate sides of the positive electrode plates 40 and the negative electrode plates 42 are respectively connected to the first positive electrode wall portion 11 and the second positive electrode wall portion 12. Through this configuration, it becomes unnecessary to use a bar-shaped shaft portion extending through the electrode bodies as the current collector. As a result, machining on the electrode bodies for allowing the bar-shaped shaft portion to be inserted through the electrode bodies becomes unnecessary.

It is possible to eliminate the configuration of connecting the multiple positive electrode plates 40 to the first positive electrode wall portion 11 and to the second positive electrode wall portion 12 using welding or a lead wire, and the configuration of connecting the multiple negative electrode plates 42 to the first negative electrode wall portion 31 and to the second negative electrode wall portion 32. Through this, it is possible to simplify the manufacturing process and reduce the manufacturing cost.

Each of the first current collecting case 5A, the second current collecting case 5B, and the third current collecting case 5C is the current collecting case 5 having the identical form, and thus it is possible to communize components thereof. In the directions Z1, Z2, the current collecting case 5 can be used as electric conducting means for the two electrode bodies 3 located on both sides of the current collecting case 5, to thereby reduce component resistance, the number of components, and the weight.

By bringing the first positive electrode wall portion 11, the second positive electrode wall portion 12, the first negative electrode wall portion 31, and the second negative electrode wall portion 32 to function as the current collectors, it becomes unnecessary to separately provide a current collector, thus reducing the component resistance, the number of components, and the weight.

It is possible to increase contact areas of the first positive electrode wall portion 11 and the second positive electrode wall portion 12 that function as the current collectors for the positive electrode with the multiple positive electrode plates 40, and contact areas between the first negative electrode wall portion 31 and the second negative electrode wall portion 32 that function as the current collectors for the negative electrode.

By setting the contact areas of the first positive electrode wall portion 11 and the second positive electrode wall portion 12 that function as the current collectors for the positive electrode with the multiple positive electrode plates 40 to be substantially equal to the contact areas of the first negative electrode wall portion 31 and the second negative electrode wall portion 32 that function as the current collectors for the negative electrode with the multiple negative electrode plates 42, it is possible to suppress bias of current flowing through the positive electrode plates 40 and the negative electrode plates 42.

The positive electrode plates 40 are directly connected to the first positive electrode wall portion 11 and the second positive electrode wall portion 12 that compose a part of the outer shell of the case 2, and the negative electrode plates 42 are directly connected to the first negative electrode wall portion 31 and the second negative electrode wall portion 32 that compose another part of the outer shell of the case 2, to thereby enhance cooling efficiency of the positive electrode plates 40 and the negative electrode plates 42.

The edge sides of the positive electrode plates 40 and the negative electrode plates 42 are connected to the first positive electrode wall portion 11 and the second positive electrode wall portion 12, to thereby obtain a damper effect relative to the positive electrode plates 40 and the negative electrode plates 42.

In this stacked battery 1, the configuration of holding the two electrode bodies with the three current collecting cases is employed, but a configuration of holding three electrode bodies with four current collecting cases, and a stacking structure of having more than the above numbers may also be employed.

Figure 8:
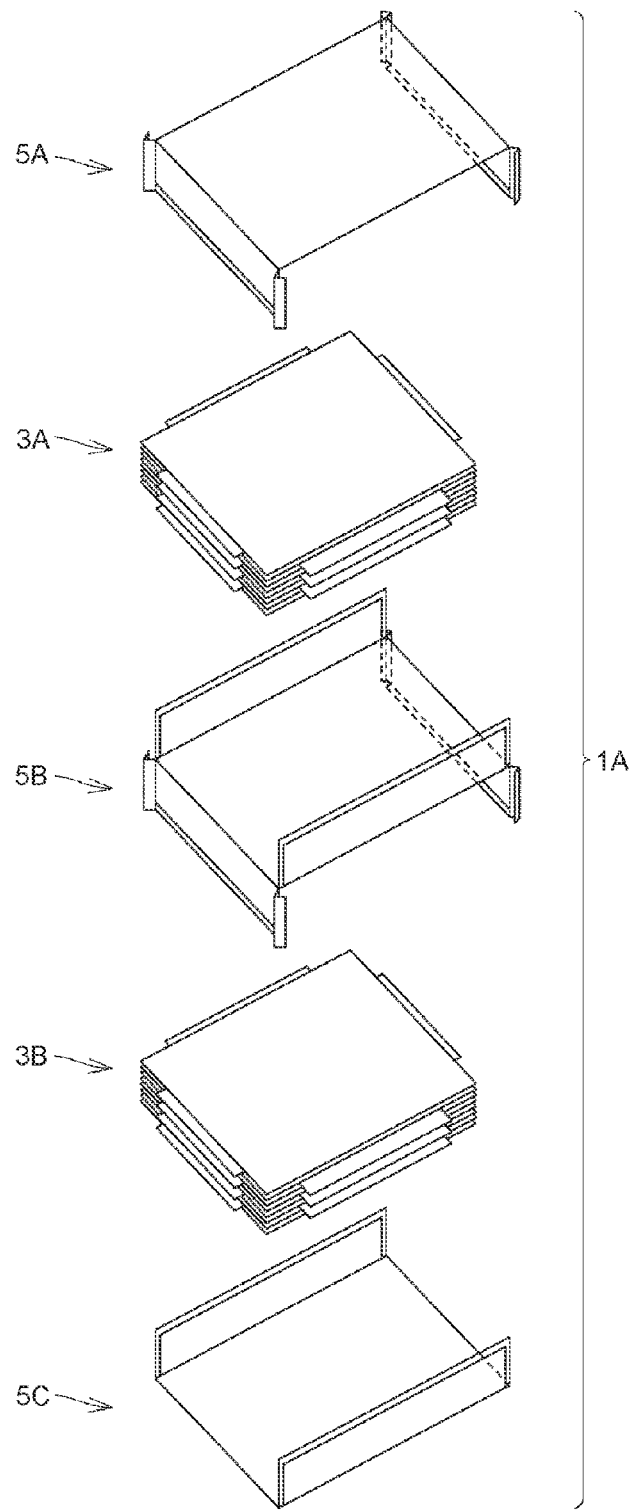
FIG. 8 is an overall exploded perspective view showing a structure of another stacked battery of the embodiment 1.

In the stacked battery 1 of the aforementioned embodiment, the case of using the current collecting case 5 having the same form in each of the first current collecting case 5A, the second current collecting case 5B, and the third current collecting case 5C has been described; and for example, as shown in FIG. 8, it may be possible to employ a configuration of a stacked battery 1A that includes the first current collecting case 5A provided with neither the first negative electrode wall portion 31 nor the second negative electrode wall portion 32 in pair, and the third current collecting case 5C provided with neither the first positive electrode wall portion 11 nor the second positive electrode wall portion 12 in pair.

Figure 9:
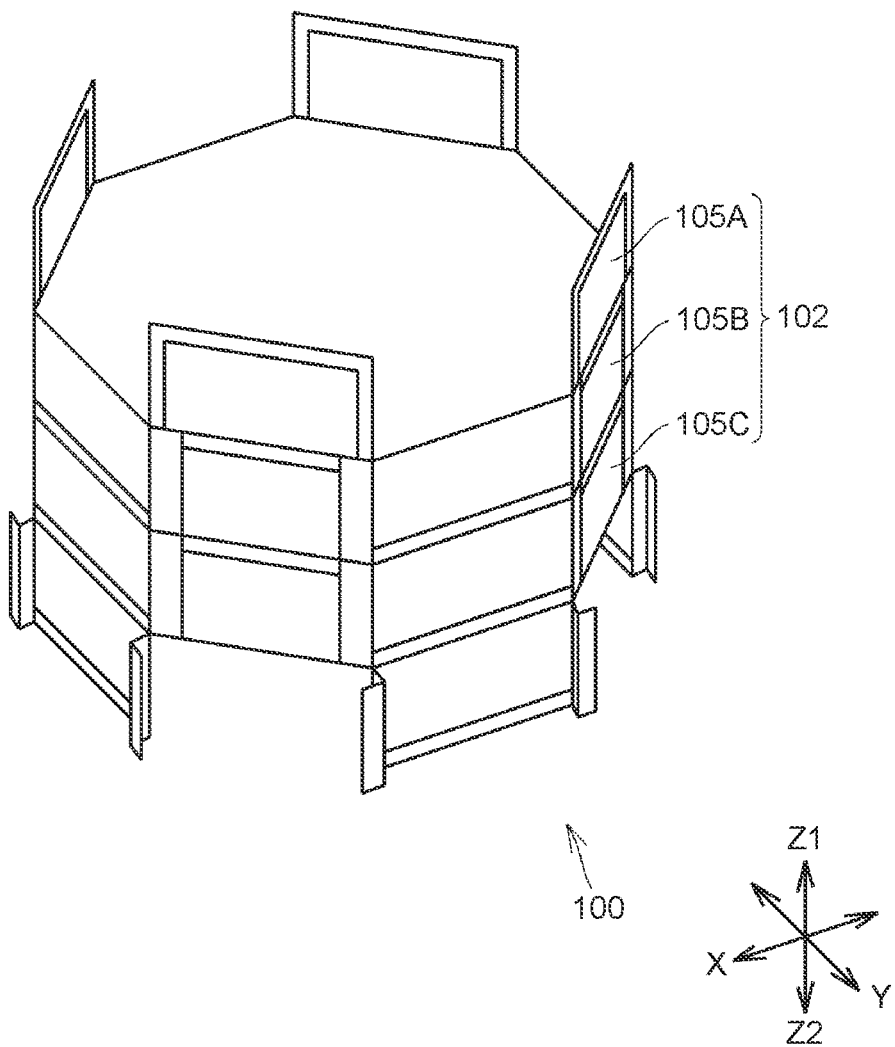
FIG. 9 is an overall perspective view showing a structure of a stacked battery of an embodiment 2.
Figure 10:
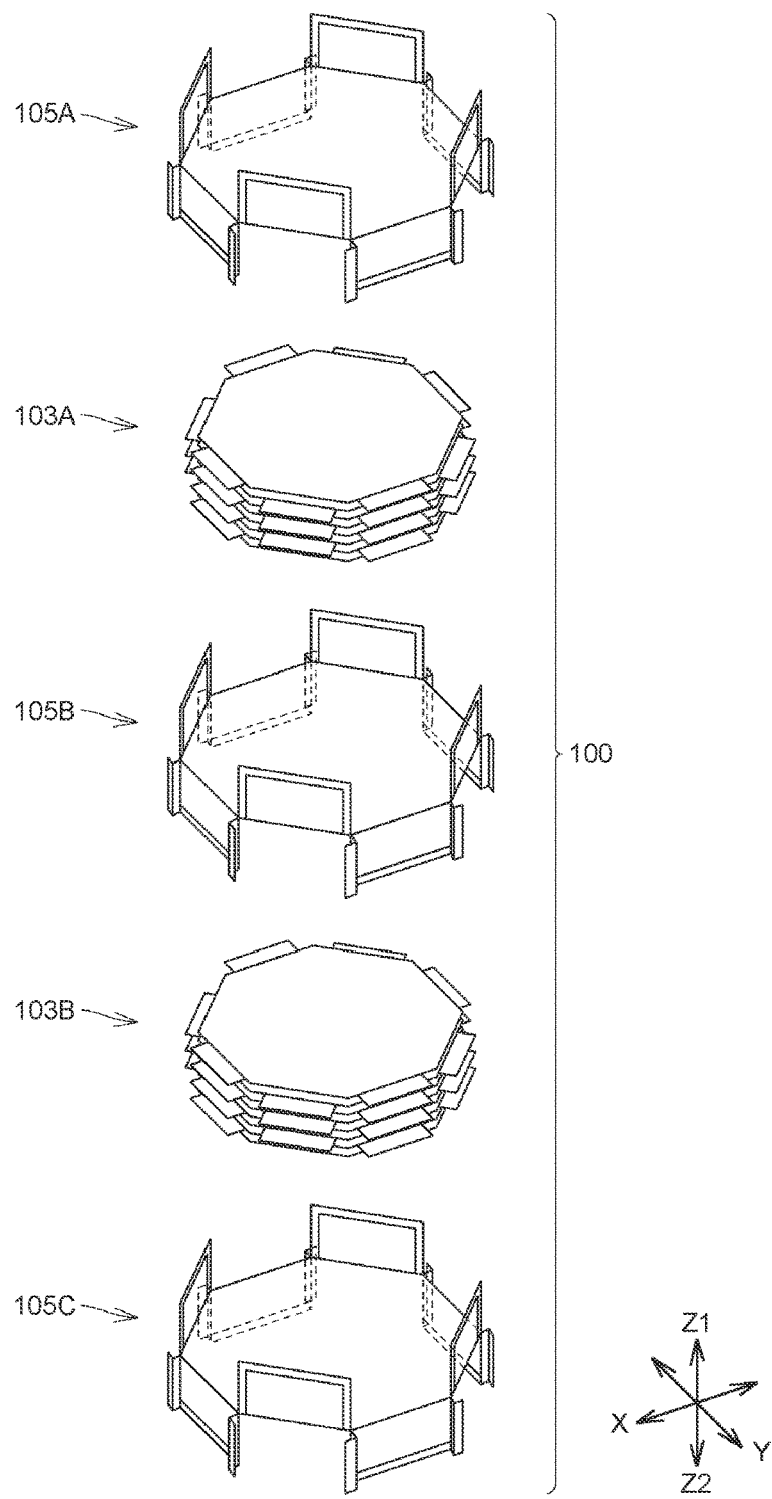
FIG. 10 is an overall exploded perspective view showing the structure of the stacked battery of the embodiment 2.
Figure 11:
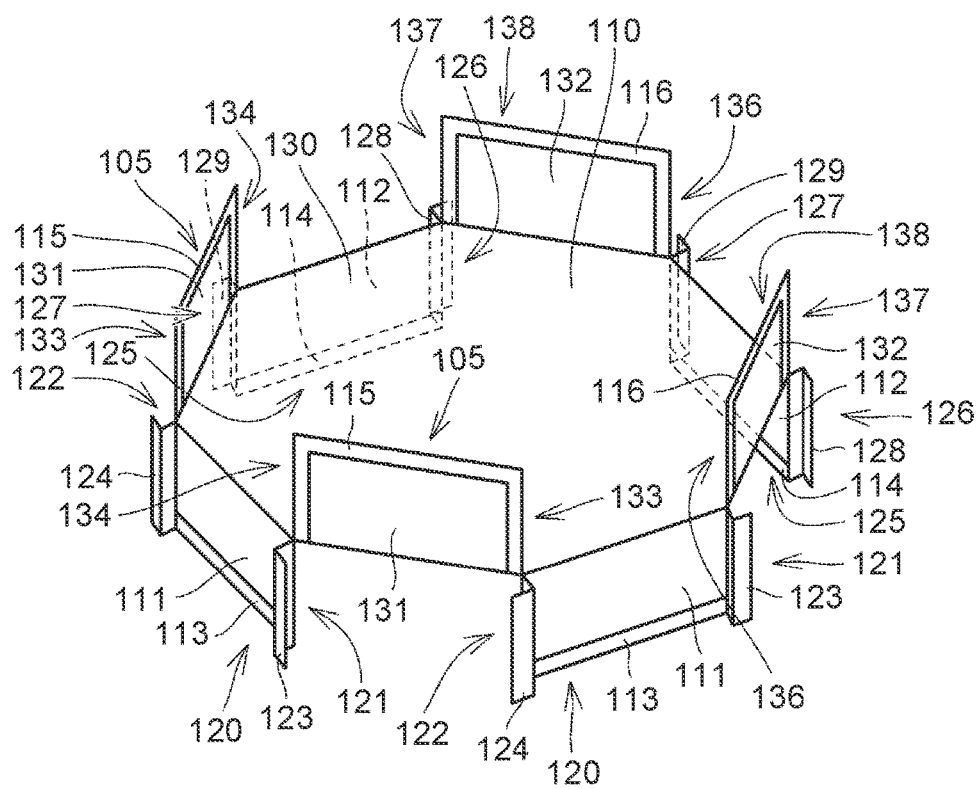
FIG. 11 is an exploded perspective view showing a basic structure of the stacked battery of the embodiment 2.
Figure 11:
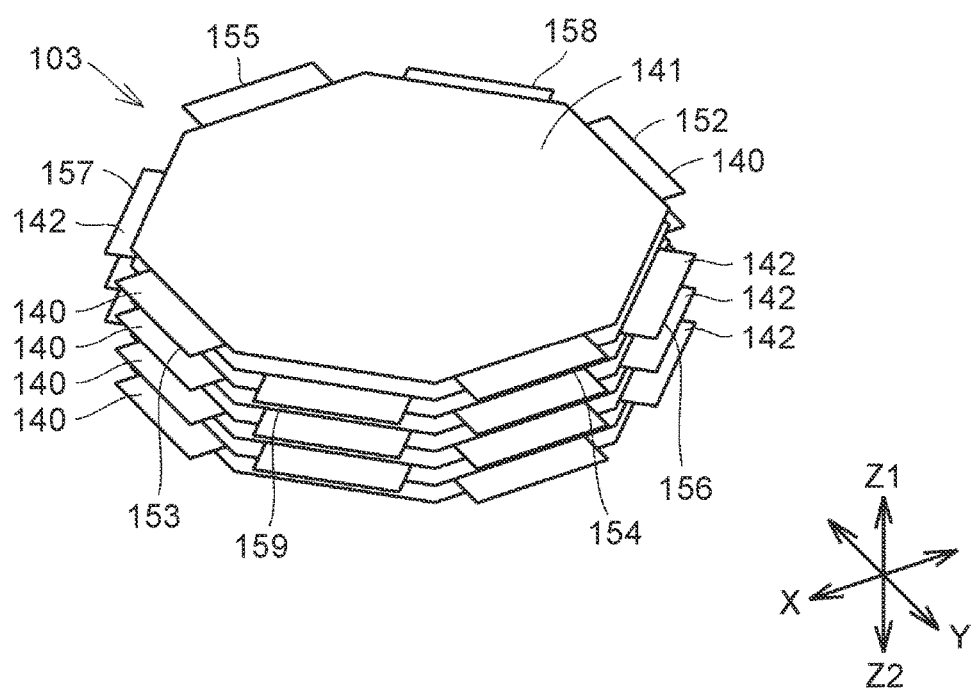
Figure 12:
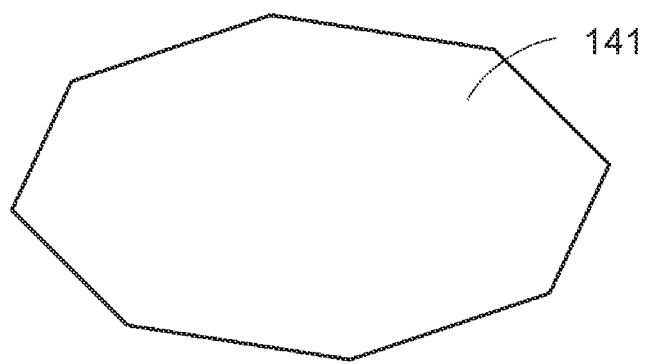
FIG. 12 is a perspective view showing a shape of a separator used in the stacked battery of the embodiment 2.
Figure 13:
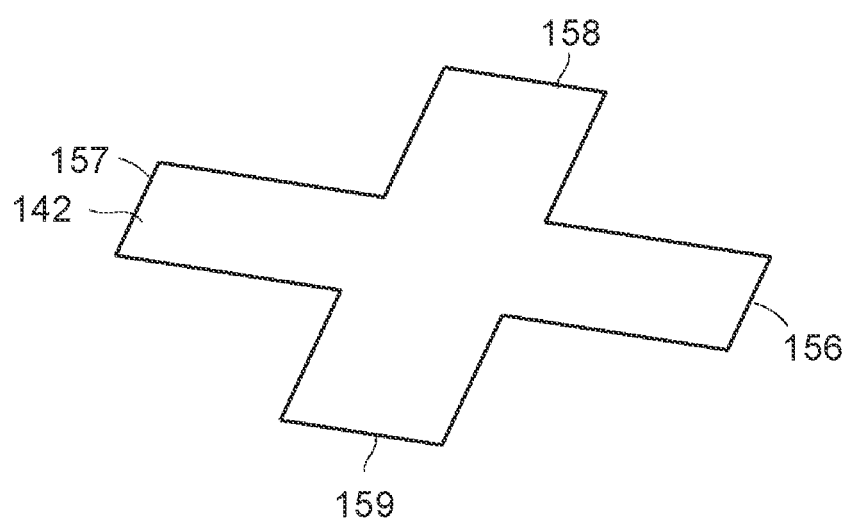
FIG. 13 is a perspective view showing a shape of a negative electrode plate used in the stacked battery of the embodiment 2.
Figure 14:
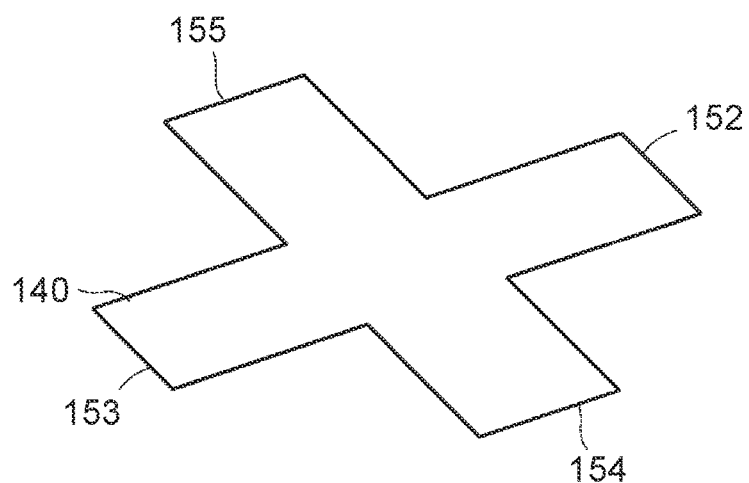
FIG. 14 is a perspective view showing a shape of a positive electrode plate used in the stacked battery of the embodiment 2.

With reference to FIG. 9 to FIG. 14, a stacked battery 100 of the embodiment 2 will be described. FIG. 9 is an overall perspective view showing a structure of the stacked battery 100, FIG. 10 is an overall exploded perspective view showing the structure of the stacked battery 100, FIG. 11 is an exploded perspective view showing a basic structure of the stacked battery 100, FIG. 12 is a perspective view showing a shape of a separator 141 used in the stacked battery 100, FIG. 13 is a perspective view showing a shape of a negative electrode plate 142 used in the stacked battery 100, and FIG. 14 is a perspective view showing a shape of a positive electrode plate 140 used in the stacked battery 100.

The structure of this stacked battery 100 has basically the same configuration as that of the stacked battery 1 of the aforementioned embodiment 1, but the stacked battery 100 of the present embodiment has a regular octagonal prism shape as viewed from the stacking direction of the electrode bodies, which is different from the rectangular shape of the stacked battery 1 of the embodiment 1.

The stacked battery 100 includes a first current collecting case 105A, a second current collecting case 105B, and a third current collecting case 105C each of which has an identical structure. These current collecting cases are so stacked as to form a case 102. Inside the case 102, a first electrode body 103A and a second electrode body 103B are housed as the electrode bodies. The case 102 is formed in a regular octagonal prism shape.

In the arrow directions Z1, Z2, as viewed from the first electrode body 103A, the first current collecting case 105A is disposed on the direction Z1 side that is an opposite side to the second electrode body 103B. The second current collecting case 105B is disposed between the first electrode body 103A and the second electrode body 103B, and is electrically insulated from the first current collecting case 105A. The third current collecting case 105C is disposed on the direction Z2 side that is an opposite side to the second current collecting case 105B as viewed from the second electrode body 103B, and is electrically insulated from the second current collecting case 105B.

That is, the first current collecting case 105A and the second current collecting case 105B are joined to each other with an electric insulating member interposed therebetween, and the first electrode body 103A is housed in an inner space of these cases, and the second current collecting case 105B and the third current collecting case 105C are joined to each other with an electric insulating member interposed therebetween, and the second electrode body 103B is housed in an inner space of these cases. The first current collecting case 105A, the second current collecting case 105B, and the third current collecting case 105C are formed of metallic Ni or Ni-plated steel plates.

With reference to FIG. 11 to FIG. 14, respective structures of each current collecting case and each electrode body will be described. The first current collecting case 105A, the second current collecting case 105B, and the third current collecting case 105C have an identical form, and the first electrode body 103A and the second electrode body 103B have an identical form. Therefore, in FIG. 11 to FIG. 14, the respective structures of these members will be described as the structures of the current collecting case 105 and the electrode body 103.

Each current collecting case 105 includes a facing portion 110 having a regular octagonal shape, two first positive electrode wall portions 111 located at positions apart from each other with a pitch of 90° therebetween on eight sides of the facing portion 110, two second positive electrode wall portion 112 connected to edge portions of this facing portion 110, two first negative electrode wall portions 131 located at different positions apart from each other with a pitch of 90° therebetween on the eight sides of the facing portion 110, and two second negative electrode wall portions 132 connected to the edge portions of this facing portion 110.

A gasket 113 as an electric insulating member is fixed to an edge portion of each first positive electrode wall portion 111 with an adhesive agent or the like. A gasket 114 as an electric insulating member is fixed to an edge portion of each second positive electrode wall portion 112 with an adhesive agent or the like.

The two first positive electrode wall portions 111 and the two second positive electrode wall portions 112 extend from edge portions of the facing portion 110 in the direction Z2, and the first positive electrode wall portions 111 and the second positive electrode wall portions 112 are so disposed to face each other.

Each first positive electrode wall portion 111 includes an edge portion 120 that connects an edge portion 121 and an edge portion 122. The edge portion 121 is formed with a caulking piece 123, and the edge portion 122 is provided with a caulking piece 124. As described above, the gasket 113 as an electric insulating member is fixed to the edge portion 120 with the adhesive agent or the like. The gasket 113 is formed of an electrically-insulating resin material or the like.

Each second positive electrode wall portion 112 includes an edge portion 125 that connects an edge portion 126 and an edge portion 127. The edge portion 126 is formed with a caulking piece 128, and the edge portion 127 is provided with a caulking piece 129. As described above, the gasket 114 as an electric insulating member is fixed to the edge portion 125 with the adhesive agent or the like. The gasket 114 is formed of an electrically-insulating resin material or the like.

Each first negative electrode wall portion 131 includes an edge portion 135 that connects an edge portion 133 and an edge portion 134. As described above, the gasket 115 as an electric insulating member is fixed to the edge portion 133, the edge portion 134, and the edge portion 135 with the adhesive agent or the like. The gasket 115 is formed of an electrically-insulating resin material or the like.

Each second negative electrode wall portion 132 includes an edge portion 138 that connects an edge portion 136 and an edge portion 137. As described above, the gasket 116 as an electric insulating member is fixed to the edge portion 136, the edge portion 137, and the edge portion 138 with the adhesive agent or the like. The gasket 116 is formed of an electrically-insulating resin material or the like.

When the first current collecting case 105A, the second current collecting case 105B, and the third current collecting case 105C having the above configurations are combined into the case 102, the caulking pieces 123, 124, 128, 129 are caulked together with the edge portions 136, 133, 137, 134.

In this manner, also when the first current collecting case 105A, the second current collecting case 105B, and the third current collecting case 105C are integrated, the electric insulation among the first current collecting case 105A, the second current collecting case 105B, and the third current collecting case 105C is secured by the gaskets 113, 114, 115, and 116.

With reference to FIG. 11 to FIG. 14, a configuration of the electrode body 103 will be described.

Each separator 141 has a regular octagonal shape. The separators 141 prevent short-circuit between the positive electrode plates 140 and the negative electrode plates 142, and also retain the electrolytic solution. As the separator 141, porous sheet having ionic permeability and electric insulation is used. As the separator 141, polyolefin-based non-woven fabric may be employed, for example. As the electrolytic solution, for example, an alkali-based aqueous solution or a KOH aqueous solution that is generally used in nickel-hydrogen batteries may be employed.

In the electrode body 103, the multiple positive electrode plates 140 and the multiple negative electrode plates 142 are alternately stacked with the separators 141 interposed between the positive electrode plates 140 and the negative electrode plates 142.

Each negative electrode plate 142 has a plate-like cross shape. Each negative electrode plate 142 has four edge sides 156, 157, 158, 159. Each negative electrode plate 142 has a negative electrode active material. As the negative electrode active material, a hydrogen absorbing alloy may be used, for example. As one example of the negative electrode plate 142, the negative electrode plate 142 has a configuration that a paste mainly containing a hydrogen absorbing alloy is applied on a base plate.

Each positive electrode plate 140 has a plate-like cross shape. Each positive electrode plate 140 has four edge sides 152, 153, 154, 155. The positive electrode plates 140 are stacked in a state of being turned at 45° relative to the negative electrode plates 142 as viewed from the stacking direction. Each positive electrode plate 140 has a positive electrode active material. As the positive electrode active material, nickel hydroxide may be used, for example. As one example of the positive electrode plate 140, the positive electrode plate 140 has a configuration that a paste mainly containing nickel hydroxide is applied on a base plate.

Respective functions of each positive electrode plate 140 and each negative electrode plate 142 are the same as those in the embodiment 1, and thus overlapped description thereof will not be repeated.

Also in the stacked battery 100 of the present embodiment, as shown in FIG. 8 of the embodiment 1, it may be possible to employ a configuration of a stacked battery that includes the first current collecting case 105A provided with neither the first negative electrode wall portion 131 nor the second negative electrode wall portion 132 in pair, and the third current collecting case 105C provided with neither the first positive electrode wall portion 111 nor the second positive electrode wall portion 112 in pair.

In the stacked battery 100 having the aforementioned configuration, a housing state of the electrode bodies 103 housed in the case 102 as viewed in the cross-sectional structure is the same as that in the configuration of the embodiment 1 as shown in FIG. 6 and FIG. 7. Hence, with the stacked battery 100 of the present embodiment, it is possible to attain the same operational effect as that of the stacked battery 1 of the embodiment 1.

Figure 15:
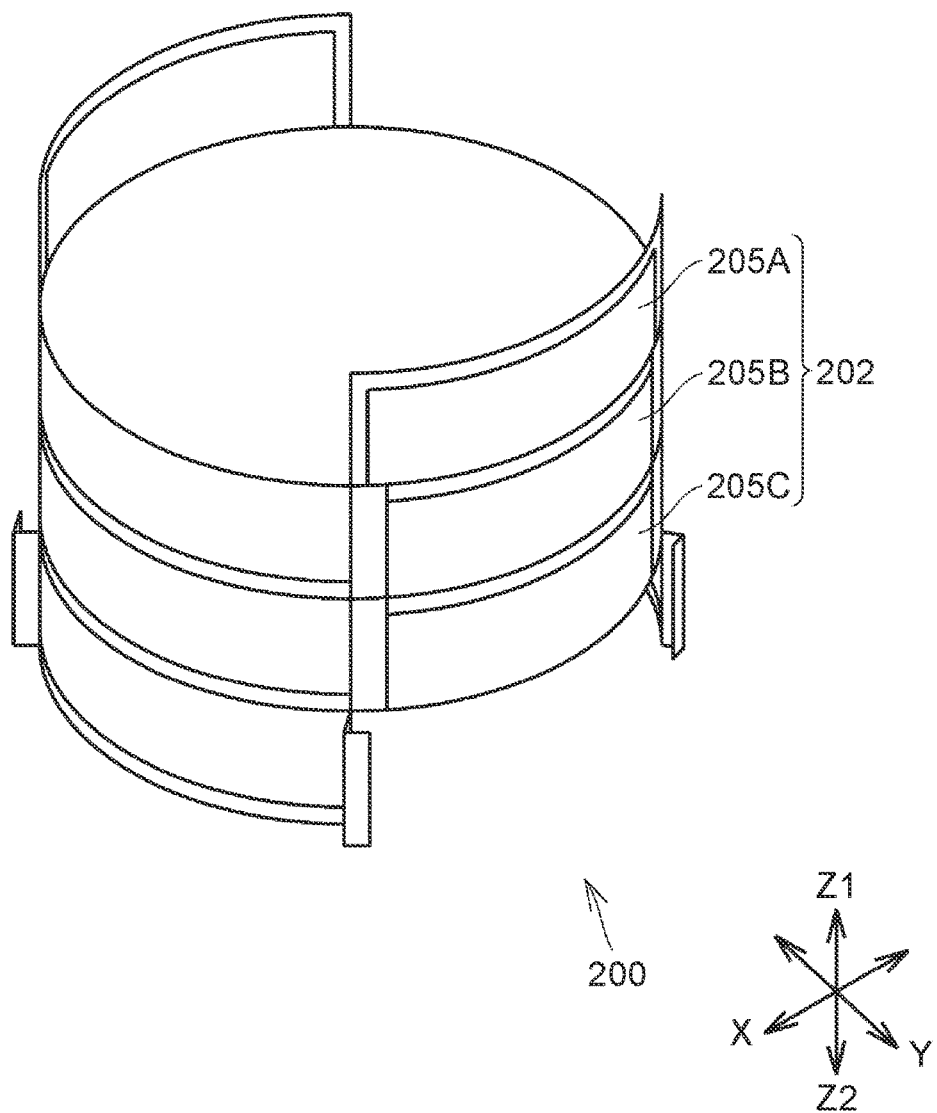
FIG. 15 is an overall perspective view showing a structure of a stacked battery of an embodiment 3.
Figure 16:
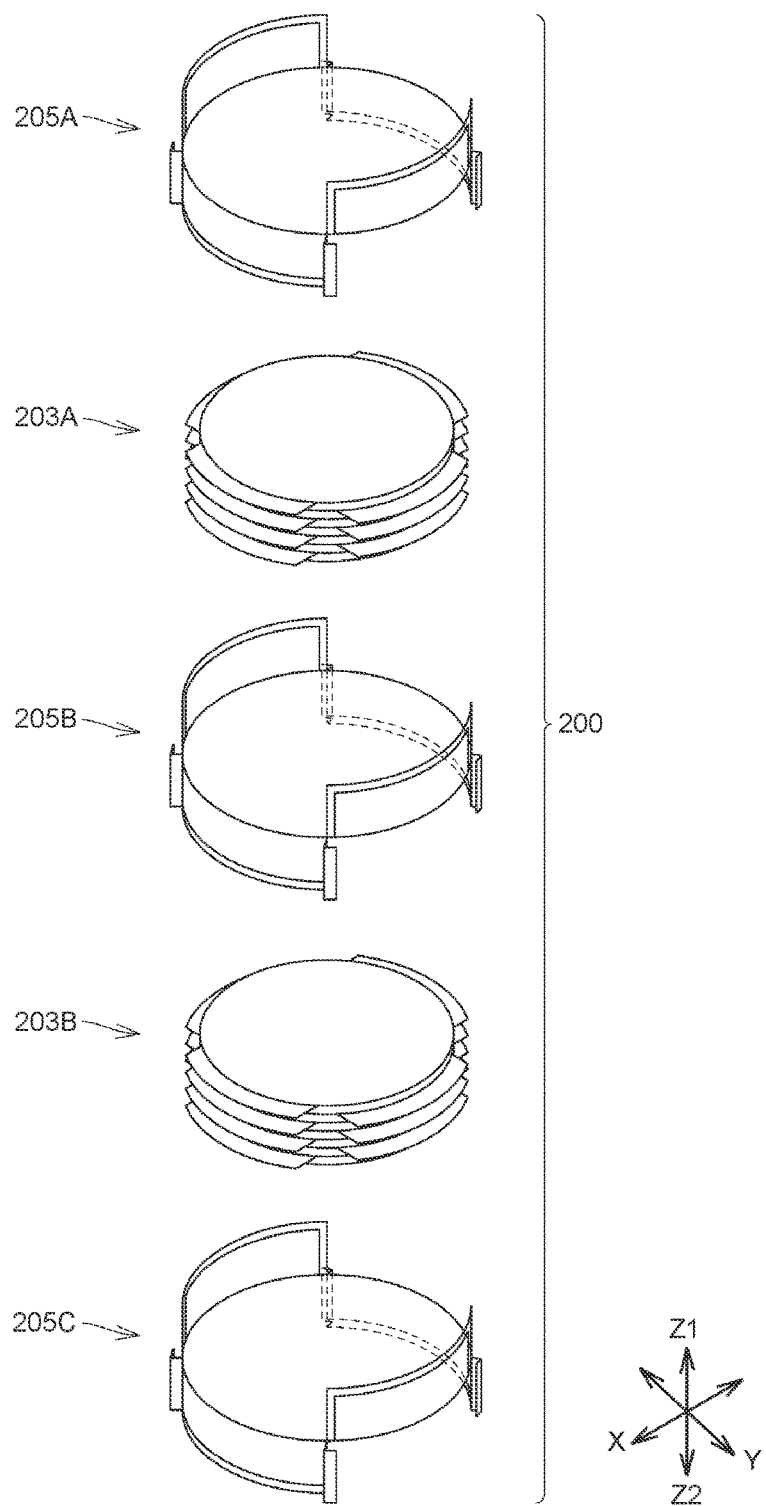
FIG. 16 is an overall exploded perspective view showing the structure of the stacked battery of the embodiment 3.
Figure 17:
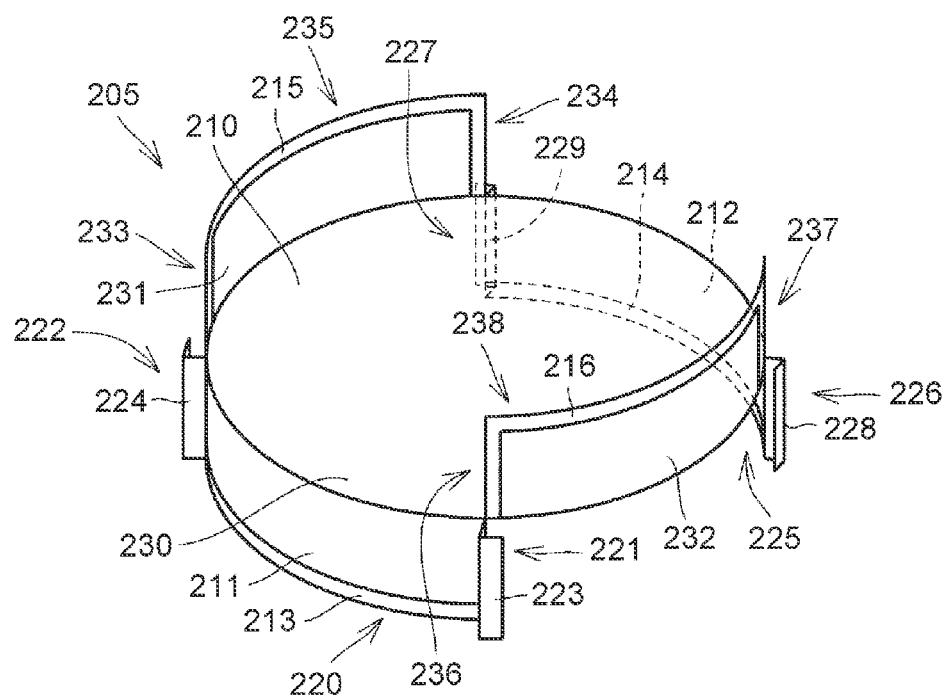
FIG. 17 is an exploded perspective view showing a basic structure of the stacked battery of the embodiment 3.
Figure 17:
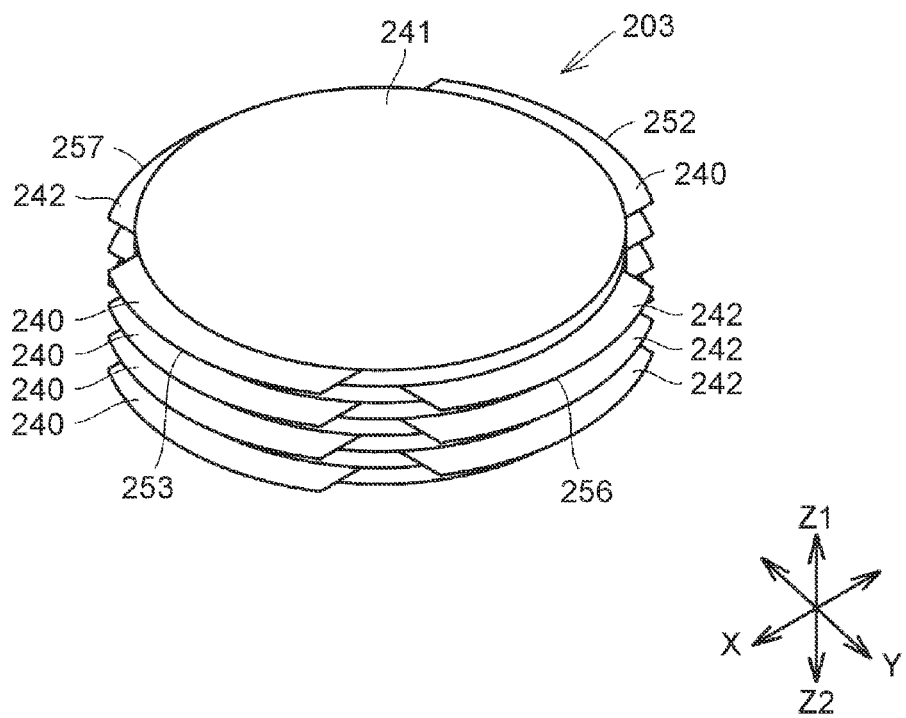
Figure 18:
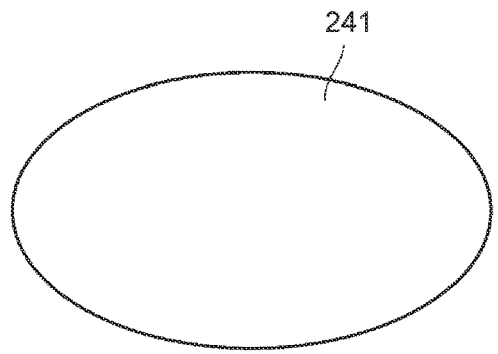
FIG. 18 is a perspective view showing a shape of a separator used in the stacked battery of the embodiment 3.
Figure 19:
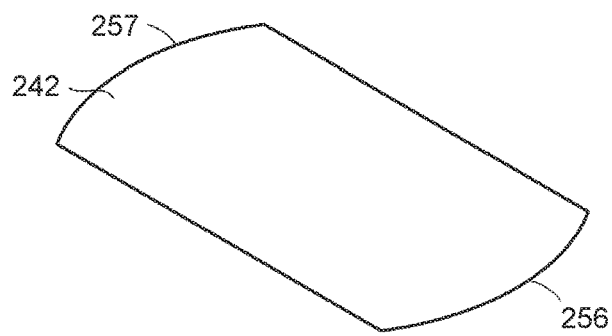
FIG. 19 is a perspective view showing a shape of a negative electrode plate used in the stacked battery of the embodiment 3.
Figure 20:
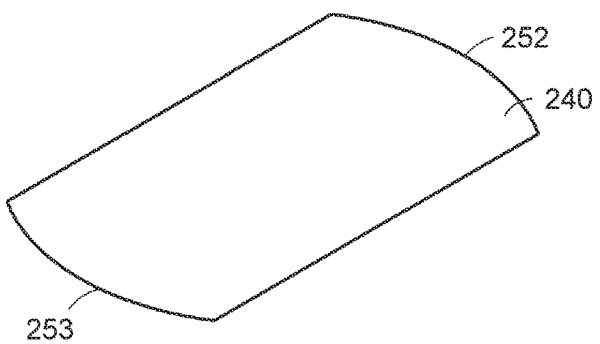
FIG. 20 is a perspective view showing a shape of a positive electrode plate used in the stacked battery of the embodiment 3.

With reference to FIG. 15 to FIG. 20, the stacked battery 200 of the embodiment 3 will be described. FIG. 15 is an overall perspective view showing a structure of the stacked battery 200, FIG. 16 is an overall exploded perspective view showing the structure of the stacked battery 200, FIG. 17 is an exploded perspective view showing a basic structure of the stacked battery 200, FIG. 18 is a perspective view showing a shape of a separator 241 used in the stacked battery, FIG. 19 is a perspective view showing a shape of a negative electrode plate 242 used in the stacked battery 200, and FIG. 20 is a perspective view showing a shape of a positive electrode plate 240 used in the stacked battery 200.

This stacked battery 200 has basically the same configuration as that of the stacked battery 1 of the aforementioned embodiment 1, but the stacked battery 200 of the present embodiment has a circular cylindrical shape as viewed from the stacking direction of the electrode bodies, which is different from the rectangular shape of the stacked battery 1 of the embodiment 1.

The stacked battery 200 includes a first current collecting case 205A, a second current collecting case 205B, and a third current collecting case 205C each of which has an identical structure. These current collecting cases are so stacked as to form a case 202. Inside the case 202, a first electrode body 203A and a second electrode body 203B are housed as the electrode body. The case 202 is formed in a regular octagonal prism shape.

In the arrow directions Z1, Z2, as viewed from the first electrode body 203A, the first current collecting case 205A is disposed on the direction Z1 side that is an opposite side to the second electrode body 203B. The second current collecting case 205B is disposed between the first electrode body 203A and the second electrode body 203B, and is electrically insulated from the first current collecting case 205A. The third current collecting case 205C is disposed on the direction Z2 side that is an opposite side to the second current collecting case 205B as viewed from the second electrode body 203B, and is electrically insulated from the second current collecting case 205B.

That is, the first current collecting case 205A and the second current collecting case 205B are joined to each other with an electric insulating member interposed therebetween, and the first electrode body 203A is housed in an inner space of these cases, and the second current collecting case 205B and the third current collecting case 205C are joined to each other with an electric insulating member interposed therebetween, and the second electrode body 203B is housed in an inner space of these cases. The first current collecting case 205A, the second current collecting case 205B, and the third current collecting case 205C are formed of metallic Ni or Ni plated steel plates.

(Structures of current collecting case and electrode body)
With reference to FIG. 17 to FIG. 20, respective structures of each current collecting case and each electrode body will be described. The first current collecting case 205A, the second current collecting case 205B, and the third current collecting case 205C have the identical form, and the first electrode body 203A and the second electrode body 203B have the identical form. Therefore, in FIG. 17 to FIG. 20, the respective structures of these members will be described as the structures of the current collecting case 205 and the electrode body 203.

Each current collecting case 205 includes: a facing portion 210 having a circular shape; at an circular circumferential edge of the facing portion 210, a first positive electrode wall portion 211 and a second positive electrode wall portions 212 so disposed as to face each other with a circumferential length at approximately 90° therebetween, and a first negative electrode wall portion 231 located at a different position apart therefrom with a pitch of 90° therebetween; and a second negative electrode wall portion 232 connected to an edge portion of the facing portion 210.

A gasket 213 as an electric insulating member is fixed to an edge portion of each first positive electrode wall portion 211 with an adhesive agent or the like. A gasket 214 as an electric insulating member is fixed to an edge portion of each second positive electrode wall portion 212 with an adhesive agent or the like.

The first positive electrode wall portions 211 and the second positive electrode wall portions 212 extend from the edge portions of the facing portion 210 in the direction Z2, and the first positive electrode wall portions 211 and the second positive electrode wall portions 212 are so disposed to face each other.

Each first positive electrode wall portion 211 includes an edge portion 220 that connects an edge portion 221 and an edge portion 222. The edge portion 221 is formed with a caulking piece 223, and the edge portion 222 is provided with a caulking piece 224. As described above, the gasket 213 as an electric insulating member is fixed to the edge portion 220 with the adhesive agent or the like. The gasket 213 is formed of an electrically-insulating resin material or the like.

Each second positive electrode wall portion 212 includes an edge portion 225 that connects an edge portion 226 and an edge portion 227. The edge portion 226 is formed with a caulking piece 228, and the edge portion 227 is provided with a caulking piece 229. As described above, the gasket 214 as an electric insulating member is fixed to the edge portion 225 with the adhesive agent or the like. The gasket 214 is formed of an electrically-insulating resin material or the like.

Each first negative electrode wall portion 231 includes an edge portion 235 that connects an edge portion 233 and an edge portion 234. As described above, the gasket 215 as an electric insulating member is fixed to the edge portion 233, the edge portion 234, and the edge portion 235 with the adhesive agent or the like. The gasket 215 is formed of an electrically-insulating resin material or the like.

Each second negative electrode wall portion 232 includes an edge portion 238 that connects an edge portion 236 and an edge portion 237. As described above, the gasket 216 as an electric insulating member is fixed to the edge portion 236, the edge portion 237, and the edge portion 238 with the adhesive agent or the like. The gasket 216 is formed of an electrically-insulating resin material or the like.

When the first current collecting case 205A, the second current collecting case 205B, and the third current collecting case 205C having the above configurations are combined into the case 202, the caulking pieces 223, 224, 228, 229 are caulked together with the edge portions 236, 233, 237, 234.

In this manner, also when the first current collecting case 205A, the second current collecting case 205B, and the third current collecting case 205C are integrated, the electric insulation among the first current collecting case 205A, the second current collecting case 205B, and the third current collecting case 205C is secured by the gaskets 213, 214, 215, and 216.

With reference to FIG. 18 to FIG. 20, a configuration of the electrode body 203 will be described.

Each separator 241 has a circular shape. The separators 241 prevent short-circuit between the positive electrode plates 240 and the negative electrode plates 242, and also retain the electrolytic solution. As the separator 241, porous sheet having ionic permeability and electric insulation is used. As the separator 241, polyolefin-based non-woven fabric may be employed, for example. As the electrolytic solution, for example, an alkali-based aqueous solution or a KOH aqueous solution that is generally used in nickel-hydrogen batteries may be employed.

In the electrode body 203, the multiple positive electrode plates 240 and the multiple negative electrode plates 242 are alternately stacked with the separators 241 interposed between the positive electrode plates 240 and the negative electrode plates 242.

Each negative electrode plate 242 has a substantially rectangular shape. The negative electrode plate 242 has straight-lined longer sides, and also has shorter sides including edge sides 256, 257 in a curved shape extending along a circular shape of the case 202. Each negative electrode plate 242 has a negative electrode active material. As the negative electrode active material, a hydrogen absorbing alloy may be used, for example. As one example of the negative electrode plate 242, the negative electrode plate 242 has a configuration that a paste mainly containing a hydrogen absorbing alloy is applied on a base plate.

Each positive electrode plate 240 has a substantially rectangular shape. Each positive electrode plate 240 has straight-lined longer sides, and also has shorter sides including edge sides 252, 253 in a curved shape extending along the circular shape of the case 202. The positive electrode plates 240 are stacked in a state of being turned at 90° relative to the negative electrode plates 242 as viewed from the stacking direction. Each positive electrode plate 240 has a positive electrode active material. As the positive electrode active material, nickel hydroxide may be used, for example. As one example of the positive electrode plate 240, the positive electrode plate 240 has a configuration that a paste mainly containing nickel hydroxide is applied on a base plate.

Respective functions of each positive electrode plate 240 and each negative electrode plate 242 are the same as those in the embodiment 1, and overlapped description thereof will not be repeated.

Also in the stacked battery 200 of the present embodiment, as shown in FIG. 8 of the embodiment 1, it may be possible to employ a configuration of a stacked battery that includes the first current collecting case 205A provided with neither the first negative electrode wall portion 231 nor the second negative electrode wall portion 232 in pair, and the third current collecting case 205C provided with neither the first positive electrode wall portion 211 nor the second positive electrode wall portion 212 in pair.

In the stacked battery 200 having the aforementioned configuration, a housing state of the electrode bodies 203 housed in the case 202 as viewed in the cross-sectional structure is the same as that in the configuration of the embodiment 1 as shown in FIG. 6 and FIG. 7. Hence, with the stacked battery 200 of the present embodiment, it is possible to attain the same operational effect as that of the stacked battery 1 of the embodiment 1.

Figure 21:
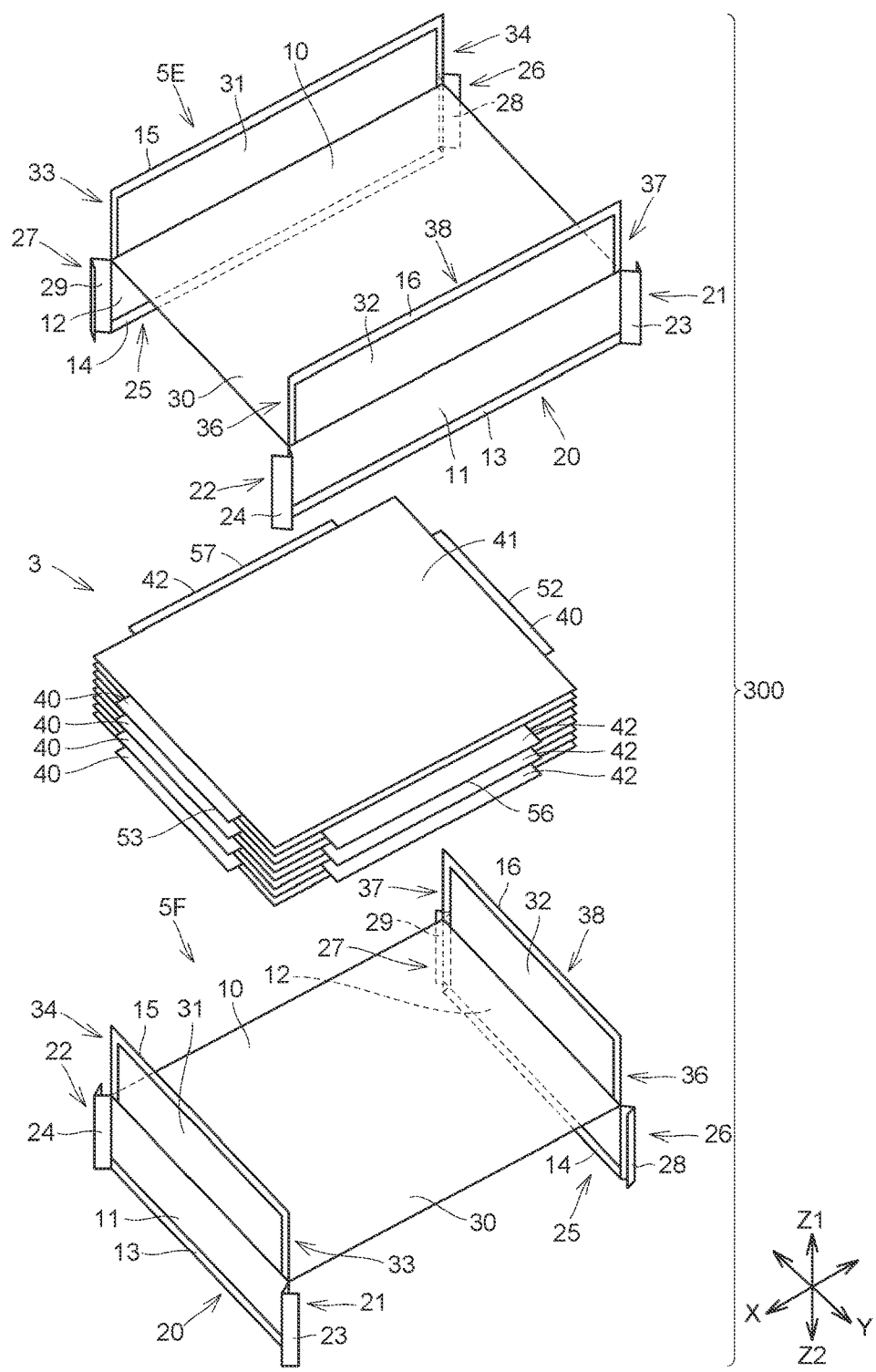
FIG. 21 is an overall exploded perspective view showing a structure of a stacked battery of another embodiment.

With reference to FIG. 21, a stacked battery 300 of another embodiment will be described. FIG. 21 is an overall exploded perspective view showing a structure of the stacked battery 300.

In each of the above embodiments, for example, as shown in FIG. 3, in the current collecting case 5 of the embodiment 1, the first positive electrode wall portion 11 and the second positive electrode wall portion 12 are provided at edge portions of the facing portion 10 so as to face each other along the direction Y, and extend in the direction Z1; and the first negative electrode wall portion 31 and the second negative electrode wall portion 32 are provided at edge portions of the facing portion 10 where no positive electrode wall portions are provided so as to face each other along the direction X, and extend in the direction Z2 opposite to the direction Z1, but the present disclosure is not limited to this configuration.

Configurations of the first current collecting case 5A and the second current collecting case 5B as shown in FIG. 21 may be employed. The first current collecting case 5A located on the direction Z1 side relative to the electrode body 3 is provided at edge portions of the facing portion 10 with the first positive electrode wall portion 11 and the second positive electrode wall portion 12, and the first negative electrode wall portion 31 and the second negative electrode wall portion 32 along the direction Y. The second current collecting case 5B located on the direction Z2 side relative to the electrode body 3 is provided at edge portions of the facing portion 10 with the first positive electrode wall portion 11 and the second positive electrode wall portion 12, and the first negative electrode wall portion 31 and the second negative electrode wall portion 32 along the direction X. Also with this configuration, as with the case of the configuration of the embodiment 1, the electric insulation among the respective current collecting cases is secured; therefore, it is possible to obtain the same operational effect as that of the stacked battery 1 of the embodiment 1. This is the same in the stacked battery 100 shown in the embodiment 2 and in the stacked battery 200 shown in the embodiment 3.

In each of the above embodiments described above, as the apparent forms, the cases of employing the rectangular parallelepiped shape, the regular octagonal prism shape, and the circular cylindrical shape have been described, but the present disclosure is not limited to these apparent forms, and the stacked battery can be implemented using other forms than these forms.

In the stacked battery, the case of using an aqueous battery has been described, but the present disclosure is not limited to the aqueous battery, and may be widely applied to a stacked battery having a configuration of housing inside a case an electrode body formed by alternately stacking multiple positive electrode plates and multiple negative electrode plates with separators interposed between the positive electrode plates and negative electrode plates.

In each of the aforementioned embodiments, the case in which the stacked battery is a nickel hydrogen battery has been described, but the present disclosure is not limited to this, and the stacked battery may also be a lithium ion battery, a nickel zinc battery, a nickel cadmium battery, or the like. In the case of using a lithium ion battery, a nickel zinc battery, or a nickel cadmium battery, members composing the positive electrode plates, the negative electrode plates, the separators, and the electrolytic solution may be appropriately selected depending on the type of the battery.

While each embodiment has thus been described, it should be understood that the embodiments disclosed herein are illustrative and non-restrictive in any respect. The technical scope of the present disclosure is defined by the terms of the claims, and is intended to include any modifications within the meaning and scope equivalent to the terms of the claims.

The stacked batteries described in the present specification may be applied to various vehicles and equipment, for example.

What is claimed is:

1. A stacked battery comprising:
   a first electrode body including
      a plurality of positive electrode plates,
      a plurality of negative electrode plates, and
      a plurality of separators,
         each of the positive electrode plates and each of negative electrode plates being alternately stacked with each of the separators interposed between each of the positive electrode plates and each of the negative electrode plates;
   a second electrode body including
      a plurality of positive electrode plates,
      a plurality of negative electrode plates, and
      a plurality of separators,
         each of the positive electrode plates and each of negative electrode plates being alternately stacked with each of the separators interposed between each of the positive electrode plates and each of the negative electrode plates;
   the second electrode body provided above the first electrode body,
   each positive electrode plate including a positive electrode protruding portion protruding more laterally than the negative electrode plate,
   each negative electrode plate including a negative electrode protruding portion protruding more laterally than the positive electrode plate;
   a first current collecting case being electrically conductive, the first current collecting case including a first facing portion facing the first electrode body in a stacking direction of the first electrode body and the second electrode body;
   a second current collecting case being electrically conductive, the second current collecting case housing the first electrode body, the second current collecting case being disposed between the first electrode body and the second electrode body, the second current collecting case being configured to be electrically insulated from the first current collecting case, the second current collecting case including a second facing portion facing one of the first electrode body and the second electrode body in the stacking direction; and
   a third current collecting case being electrically conductive, the third current collecting case housing the second electrode body, the third current collecting case being configured to be electrically insulated from the second electrode body, the third current collecting case including a third facing portion facing the second electrode body in the stacking direction,
   the first current collecting case, the second current collecting case, and the third current collecting case being stacked in this order in the stacking direction,
   the first current collecting case including a first positive electrode wall portion, the first positive electrode wall portion extending from an edge portion of the first facing portion such that the first positive electrode wall portion covers a first side portion where the positive electrode protruding portion of the first electrode body is located, an inner surface of the first positive electrode wall portion being electrically connected to an edge side of the positive electrode protruding portion of the first electrode body,
   the second current collecting case including a second positive electrode wall portion, the second positive electrode wall portion extending from an edge portion of the second facing portion such that the second positive electrode wall portion covers a first side portion where the positive electrode protruding portion of the second electrode body is located, an inner surface of the second positive electrode wall portion being electrically connected to an edge side of the positive electrode protruding portion of the second electrode body, the second current collecting case including a first negative electrode wall portion, the first negative electrode wall portion extending from an edge portion of the second facing portion such that the first negative electrode wall portion covers a second side portion where the negative electrode protruding portion of the first electrode body is located, an inner surface of the first negative electrode wall portion being electrically connected to an edge side of the negative electrode protruding portion of the first electrode body,
   the third current collecting case including a second negative electrode wall portion, the second negative electrode wall portion extending from an edge portion of the third facing portion such that the second negative electrode wall portion covers a second side portion where the negative electrode protruding portion of the second electrode body is located, an inner surface of the second negative electrode wall portion being electrically connected to an edge side of the negative electrode protruding portion of the second electrode body.

2. The stacked battery according to claim 1, wherein
   the positive electrode protruding portion includes a pair of protruding portions such that one of protruding portions faces the other one of the protruding portions,
   the first positive electrode wall portion includes a pair of wall portions that are electrically connected to the positive electrode protruding portion of the first electrode body,
   the second positive electrode wall portion includes a pair of wall portions that are electrically connected to the positive electrode protruding portion of the second electrode body,
   the negative electrode protruding portion includes a pair of protruding portions such that one of the protruding portions faces the other one of the protruding portions, the first negative electrode wall portion includes a pair of wall portion that are electrically connected to the negative electrode protruding portion of the first electrode body, and the second negative electrode wall portion includes a pair of wall portions that are electrically connected to the negative electrode protruding portion of the second electrode body.

3. The stacked battery according to claim 1, wherein a whole of the edge side of the positive electrode protruding portion is electrically connected to the first positive electrode wall portion, a whole of the edge side of the positive electrode protruding portion is electrically connected to the second positive electrode wall portion, a whole of the edge side of the negative electrode protruding portion is electrically connected to the first negative electrode wall portion, and a whole of the edge side of the negative electrode protruding portion is electrically connected to the second negative electrode wall portion.

4. The stacked battery according to claim 1, wherein the edge portion of the first facing portion of the first current collecting case and the edge portion of the first positive electrode wall portion of the first current collecting case are in contact respectively with the edge portion of the second facing portion of the second current collecting case and the edge portion of the first negative electrode wall portion of the second current collecting case via electric insulating members, and the edge portion of the second facing portion of the second current collecting case and the edge portion of the second positive electrode wall portion of the second current collecting case are in contact respectively with the edge portion of the third facing portion of the third current collecting case and the edge portion of the second negative electrode wall portion of the third current collecting case via electric insulating members.

5. The stacked battery according to claim 1, wherein each of the first current collecting case, the second current collecting case, and the third current collecting case has a rectangular shape as viewed from the stacking direction, the first electrode body includes the positive electrode protruding portion, the second electrode body includes the positive electrode protruding portion, the positive electrode protruding portion of the first electrode body is provided at a position where the positive electrode protruding portion of the first electrode body and the positive electrode protruding portion of the second electrode body face each other, the first electrode body includes the negative electrode protruding portion, the second electrode body includes the negative electrode protruding portion, the negative electrode protruding portions of the first electrode body is provided at a position where the negative electrode protruding portion of the first electrode body and the negative electrode protruding portion of the second electrode body face each other, the first current collecting case includes the first positive electrode wall portion, the second current collecting case includes the second positive electrode wall portion, the second current collecting case includes the first negative electrode wall portion, and the third current collecting case includes the second negative electrode wall portion.

* * * * *